(12) United States Patent
Kim et al.

(10) Patent No.: US 11,016,531 B2
(45) Date of Patent: May 25, 2021

(54) FOLDABLE DEVICE AND METHOD FOR CONTROLLING IMAGE CAPTURING BY USING PLURALITY OF CAMERAS

(71) Applicant: Samsung Electronics Co., Ltd., Gyeonggi-do (KR)

(72) Inventors: Kyunghwa Kim, Gyeonggi-do (KR); Junho Choi, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/850,123

(22) Filed: Apr. 16, 2020

(65) Prior Publication Data

US 2020/0356140 A1   Nov. 12, 2020

(30) Foreign Application Priority Data

May 9, 2019   (KR) .................. 10-2019-0054209

(51) Int. Cl.
 *G06F 1/16* (2006.01)
(52) U.S. Cl.
 CPC .......... *G06F 1/1616* (2013.01); *G06F 1/1647* (2013.01); *G06F 1/1686* (2013.01)
(58) Field of Classification Search
 CPC ..... G06F 1/1616; G06F 1/1647; G06F 1/1686
 See application file for complete search history.

(56) References Cited

U.S. PATENT DOCUMENTS

| | | | |
|---|---|---|---|
| 10,761,569 B2 * | 9/2020 | Klein | G06F 3/0488 |
| 2012/0319594 A1 | 12/2012 | Ko | |
| 2014/0285476 A1 | 9/2014 | Cho et al. | |
| 2015/0189178 A1 * | 7/2015 | Lombardi | H04N 5/23258 348/207.99 |

(Continued)

FOREIGN PATENT DOCUMENTS

| | | |
|---|---|---|
| KR | 10-2014-0090921 A | 7/2014 |
| KR | 10-2016-0092877 A | 8/2016 |
| KR | 10-2018-0096170 A | 8/2018 |

OTHER PUBLICATIONS

International Search Report dated Jul. 24, 2020.
European Search Report dated Oct. 9, 2020.

*Primary Examiner* — Adrian S Wilson
(74) *Attorney, Agent, or Firm* — Cha & Reiter, LLC.

(57) ABSTRACT

The disclosure relates to a foldable electronic device and a method for controlling image capturing by using a plurality of cameras. The foldable electronic device includes: a first housing including a first surface and a third surface; a second housing including a second surface and a fourth surface; a first display disposed on the first and second surfaces; a second display disposed on the third surface; a first camera module disposed on the third surface; second camera modules disposed on the fourth surface; a memory; and a processor. The processor is configured to: when the foldable electronic device is in a closed state, display a preview image obtained from the first camera module on the second display; detect a user input for changing an image capturing mode; sense whether a state of the foldable electronic device (Continued)

is changed; and when the state of the foldable electronic device is changed, display information relating to the second camera modules on the second display. Other embodiments are possible and disclosed.

20 Claims, 27 Drawing Sheets

(56) References Cited

U.S. PATENT DOCUMENTS

| | | | |
|---|---|---|---|
| 2015/0304533 A1* | 10/2015 | Zhang | H04N 5/2256 348/14.02 |
| 2015/0381929 A1* | 12/2015 | Lee | G06F 1/1686 348/14.03 |
| 2016/0050408 A1 | 2/2016 | Lee et al. | |
| 2016/0127652 A1 | 5/2016 | Park et al. | |
| 2016/0241784 A1* | 8/2016 | Baek | H04N 21/4432 |
| 2017/0094168 A1 | 3/2017 | Kang et al. | |
| 2017/0220307 A1* | 8/2017 | Da Silva Ramos | G06F 3/04817 |
| 2017/0357473 A1* | 12/2017 | Kim | G06F 1/1681 |
| 2018/0107360 A1* | 4/2018 | Kim | G06F 1/1686 |
| 2018/0115713 A1* | 4/2018 | Lee | H04N 5/23293 |
| 2018/0241943 A1 | 8/2018 | Lee | |
| 2018/0332205 A1 | 11/2018 | Hawthorne et al. | |
| 2019/0004764 A1 | 1/2019 | Son et al. | |
| 2020/0402304 A1* | 12/2020 | Hwang | G06K 9/00315 |

* cited by examiner

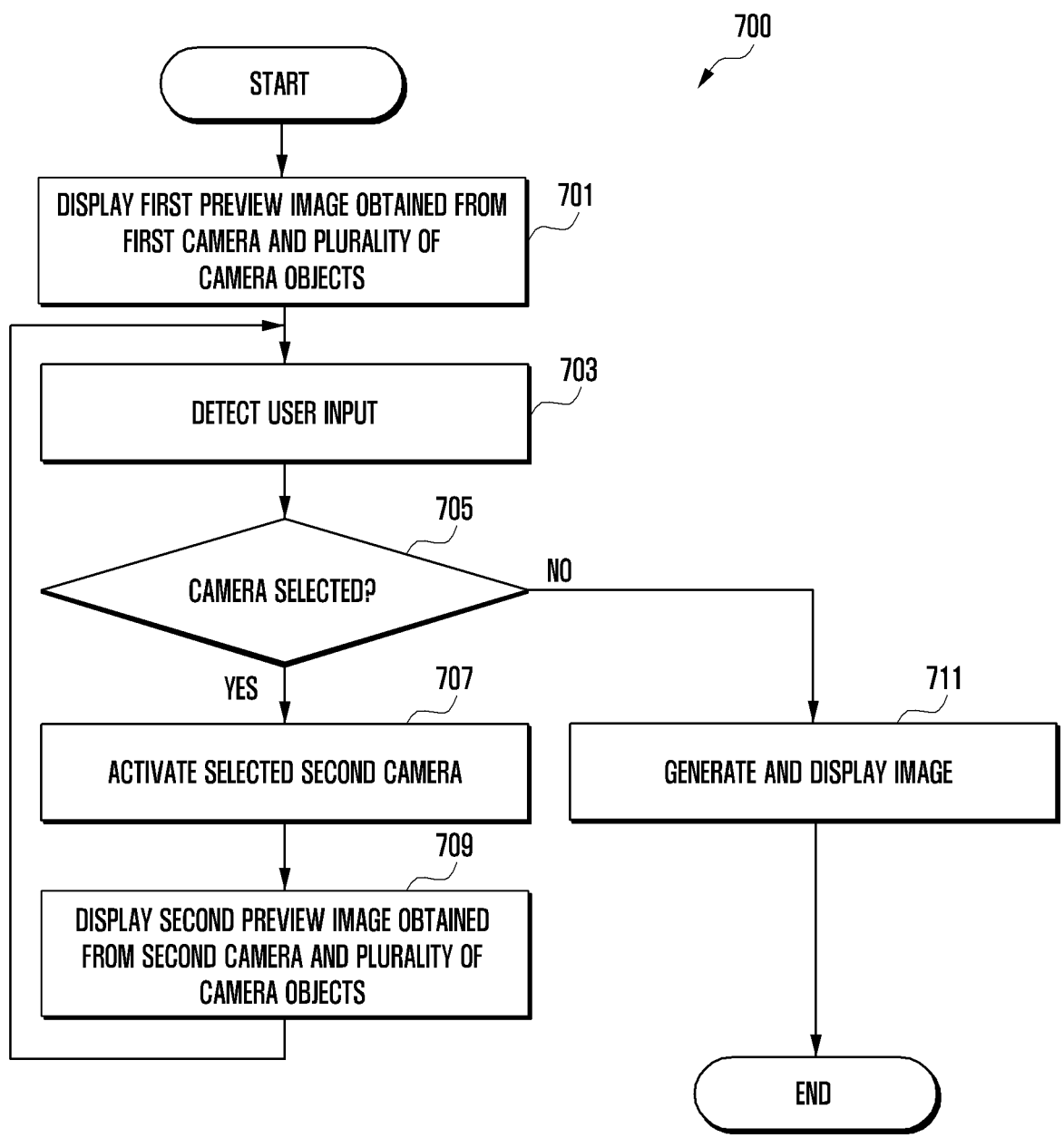

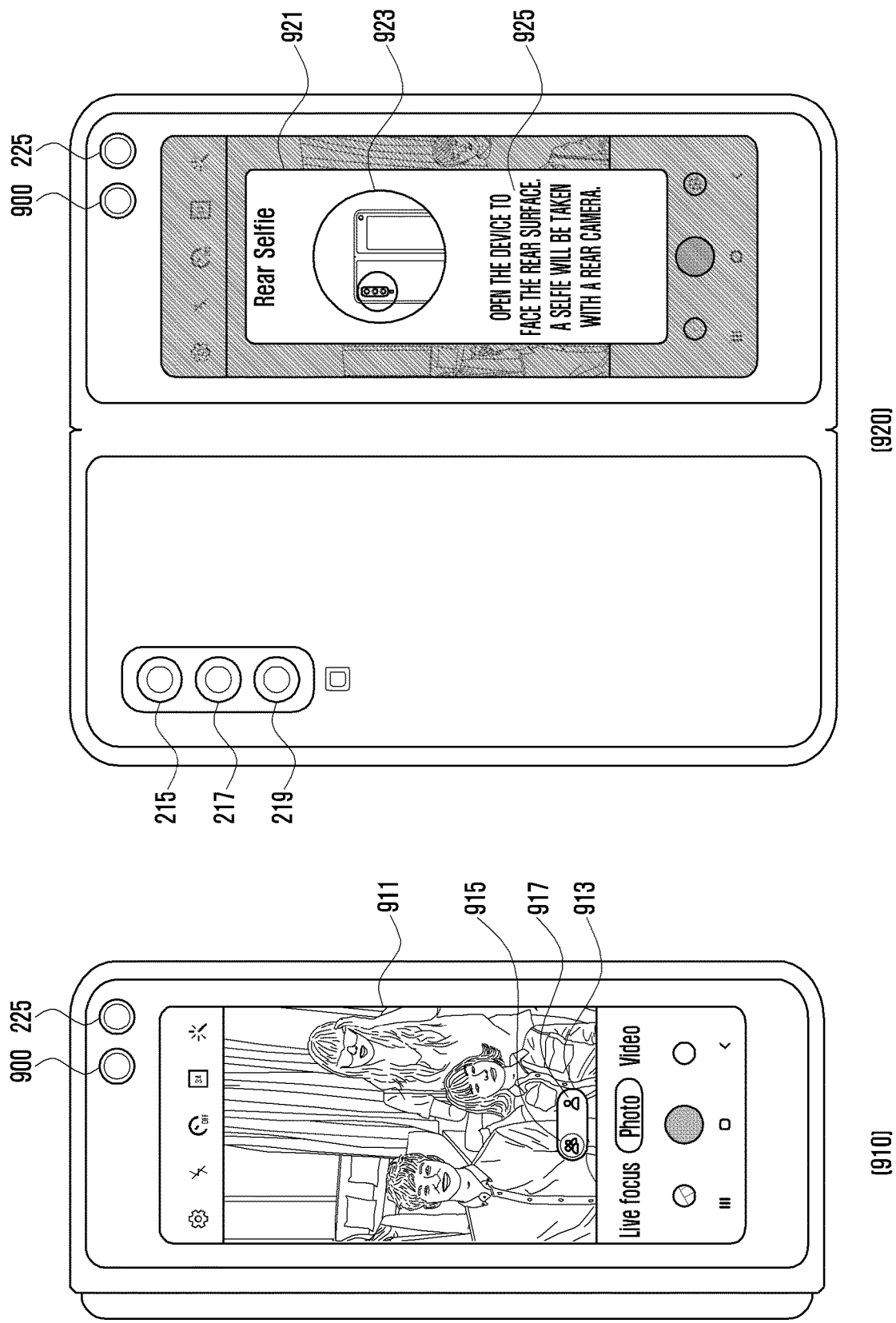

[940]

[1130]

FOLDABLE DEVICE AND METHOD FOR CONTROLLING IMAGE CAPTURING BY USING PLURALITY OF CAMERAS

CROSS-REFERENCE TO RELATED APPLICATION(S)

This application is based on and claims priority under 35 U.S.C. 119 to Korean Patent Application No. 10-2019-0054209, filed on May 9, 2019, in the Korean Intellectual Property Office, the disclosure of which is herein incorporated by reference in its entirety.

BACKGROUND

1) Field

One or more embodiments disclosed herein provide a foldable electronic device and a method for controlling image capturing by using a plurality of cameras.

2) Description of Related Art

With the advance of digital technology, various types of electronic devices such as mobile communication terminals, personal digital assistants (PDAs), electronic organizers, smartphones, tablet personal computers (PCs), and wearable devices are becoming increasingly widely used. Such electronic devices have continuously evolved in terms of hardware and/or software and the functions supported by thee devices have increased.

For example, an electronic device may include a camera (hereinafter, referred to as "first camera") disposed on a rear surface (e.g. cover part), and a camera (hereinafter, referred to as "second camera") disposed on a front surface on which a display is mounted. If an image is captured by using the second camera (e.g. selfie), the user may capture the image while checking a preview image (e.g. the user's face) displayed on the display. However, performance of the first camera (e.g. angle of view, resolution) may be better than that of the second camera.

The size of the display (or screen) of such an electronic device also has increased, and the electronic device can provide various services through a relatively large screen to the user. For user convenience, an electronic device having a large screen display that can be folded (hereinafter, referred to as "foldable device") has been released. The foldable device may include a foldable (or bendable) display (e.g. flexible display) mounted therein, and may be used by being folded or unfolded.

Because the first camera has better performance compared to the second camera, and because the foldable device can be folded, the user may want to capture an image of himself or herself (e.g. selfie) by using the first camera while the device is folded. However, in this case, because the foldable display while the device is folded is not visible, the user cannot see the flexible display and thus cannot see the preview image that is displayed on the flexible display.

The above information is presented as background information only to assist with an understanding of the disclosure. No determination has been made, and no assertion is made, as to whether any of the above might be applicable as prior art with regard to the disclosure.

SUMMARY

Certain embodiments disclosed herein may provide a method and a foldable device by which a user can take a selfie with a camera having good performance while viewing himself or herself on a display.

A foldable electronic device according to an embodiment may include: a first housing including a first surface and a third surface opposite to the first surface; a second housing including a second surface extending from the first surface and a fourth surface opposite to the second surface; a first display disposed on the first surface and the second surface; a second display disposed on at least a part of the third surface; at least one first camera module disposed on at least a part of the third surface; a plurality of second camera modules disposed on at least a part of the fourth surface; a memory; and a processor, wherein the processor is configured to: when the foldable electronic device is in a closed state, display a preview image obtained from the at least one first camera module on the second display; detect a user input for changing an image capturing mode; sense whether a state of the foldable electronic device is changed, in response to detecting the user input for changing the image capturing mode; and when the state of the foldable electronic device is changed, display information relating to the plurality of second camera modules on the second display.

A foldable electronic device according to an embodiment may include: a first surface oriented in a first direction in a folded state and a second surface oriented in a second direction opposite to the first direction; a first display disposed on the first surface; at least one first camera module disposed on the first surface; a plurality of second camera modules disposed on the second surface; a memory; and a processor, wherein the processor is configured to: when the foldable electronic device is in the folded state, display a preview image obtained from the at least one first camera module on the first display; detect a user input for changing an image capturing mode; sense whether the foldable electronic device is unfolded, in response to detecting the user input for changing the image capturing mode; and when the foldable electronic device is unfolded, display information relating to the plurality of second camera modules on the first display.

An operation method of a foldable electronic device including a first display disposed on a first surface and a second surface of the foldable electronic device and a second display disposed in a direction opposite to the first display according to an embodiment may include: when the foldable electronic device is in a closed state, displaying, on the second display, a preview image obtained from at least one first camera module disposed on a third surface on which the second display is disposed; detecting a user input for changing an image capturing mode; sensing whether a state of the foldable electronic device is changed, in response to detecting the user input for changing the image capturing mode; and when the state of the foldable electronic device is changed, displaying, on the second display, information relating to a plurality of second camera modules disposed on a fourth surface extending from the third surface in an open state of the foldable electronic device.

BRIEF DESCRIPTION OF THE DRAWINGS

For a more complete understanding of the disclosure and its advantages, reference is now made to the following description taken in conjunction with the accompanying drawings, in which like reference numerals represent like parts:

FIG. 7 is a flowchart illustrating an image capturing control method of an electronic device according to an embodiment;

FIGS. 9A-9C are views illustrating an example of a user interface indicating a plurality of camera objects in an electronic device according to an embodiment;

DETAILED DESCRIPTION

Figure 1:
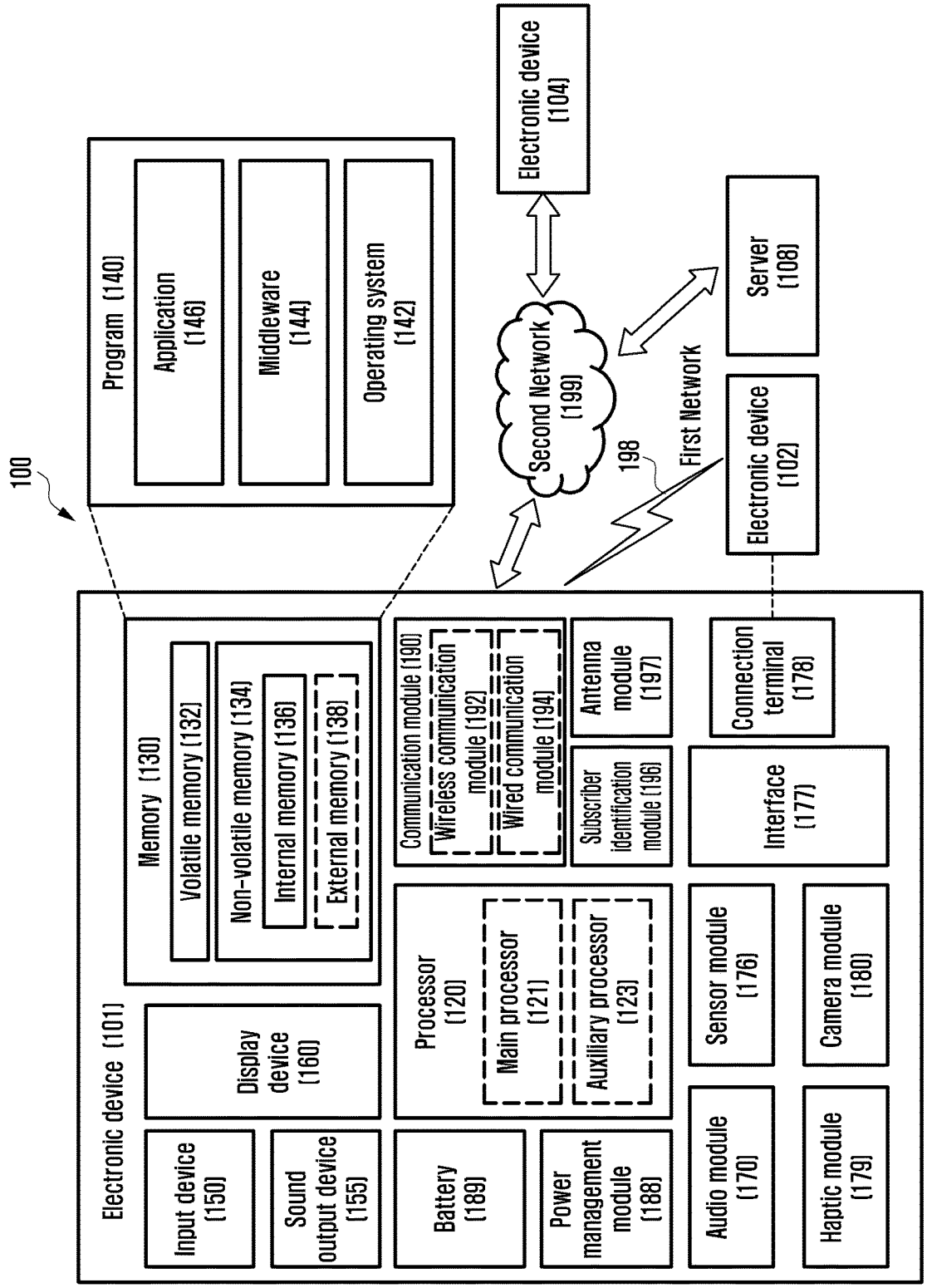
FIG. 1 is a block diagram of an electronic device in a network environment according to various embodiments.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector), The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2A:
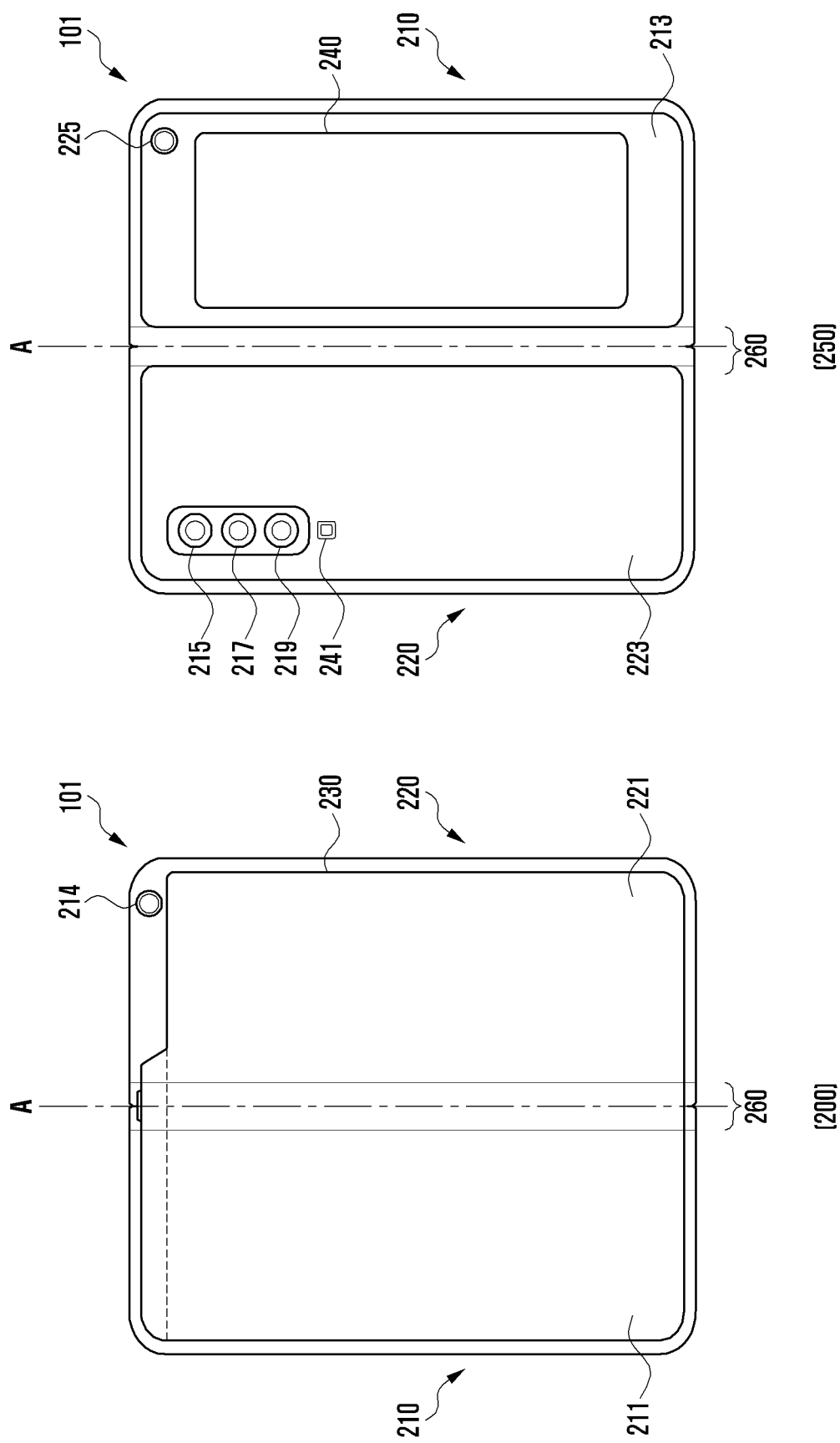
FIG. 2A is a view illustrating an open state of an electronic device according to an embodiment.

FIG. 2A is a view illustrating an open state of an electronic device according to an embodiment.

Referring to FIG. 2A, an electronic device (e.g. electronic device 101 in FIG. 1) according to an embodiment may include a first housing 210 that in turn includes a first surface 211 and a third surface 213, and a second housing 220 that in turn includes a second surface 221 and a fourth surface 223. The first surface 211 of the first housing 210 and the second surface 221 of the second housing 220 may constitute a front surface 200 of the electronic device 101, and the third surface 213 of the first housing 210 and the fourth surface 223 of the second housing 220 may constitute a rear surface 250 of the electronic device 101.

The first housing 210 and the second housing 220 may be arranged at both sides of a folding axis (e.g. axis A), and may be generally symmetric with respect to the folding axis. For example, on the front surface 200 of the electronic device 101, the first housing 210 may be disposed at the left side of the electronic device 101 with respect to the folding axis, and the second housing 220 may be disposed at the right side of the electronic device 101 with respect to the folding axis. The first housing 210 and the second housing 220 may be designed to be folded on each other. A hinge structure 260 may be disposed between the first housing 210 and the second housing 220 such that the front surface 200 of the electronic device 101 can be folded.

An angle or distance between the first housing 210 and the second housing 220 may be changed according to whether the electronic device 101 is in an open state, a closed state, or an intermediate state. For example, in the open state, the electronic device may be opened, flat (or even), or unfolded. In the open state, the first housing 210 and the second housing 220 may be arranged side by side. That is, the electronic device 101 is completely unfolded. The open state may mean that the angle between the first housing 210 and the second housing 220 is 180 degrees. Thus, in the open state, the first surface 211 of the first housing 210 and the second surface 221 of the second housing 220 may be arranged to be oriented in the identical direction. FIG. 2A illustrates the front surface 200 of the electronic device 101 and the rear surface 250 of the electronic device 101 if the electronic device 101 is in an open state.

Figure 2B:
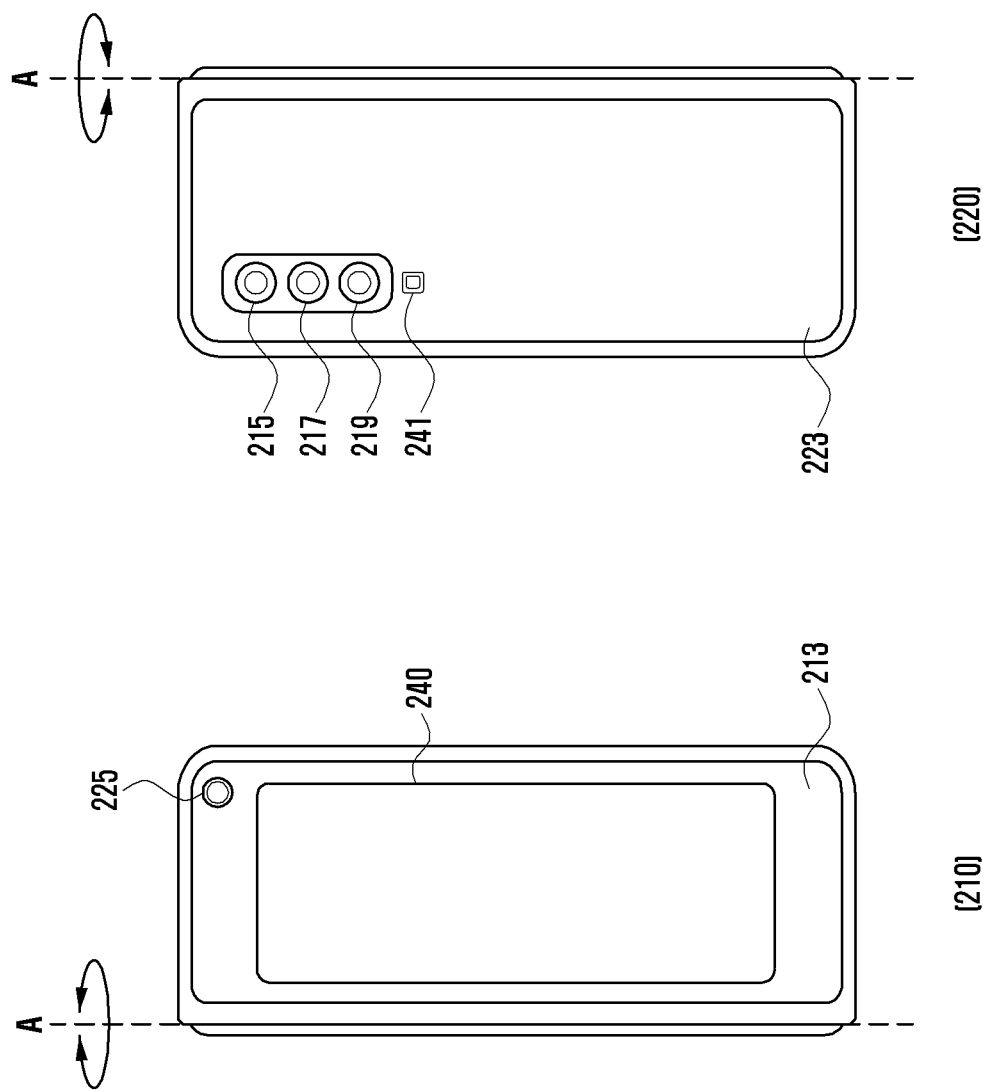
FIG. 2B is a view illustrating a closed state of an electronic device according to an embodiment.

In the closed state, the electronic device 101 may be closed or folded (e.g. FIG. 2B). In the closed state, the first housing 210 and the second housing 220 are arranged to face each other. That is, the electronic device 101 is completely folded. The closed state may mean that the angle between the first housing 210 and the second housing 220 is a narrow angle (e.g. 0-5 degrees). Thus, in the closed state, the first surface 211 of the first housing 210 and the second surface 221 of the second housing 220 may face each other. In the following description, the electronic device 101 implemented in an in-folding type as described, but certain aspects of the following description can be also identically or similarly implemented for the electronic device 101 implemented in an out-folding type. In the out-folding type, the flexible display may be disposed on the outside of the electronic device, such that the flexible display is visible when the device is folded.

The intermediate state may indicate a state in which the first housing 210 and the second housing 220 are arranged to make a particular angle (e.g. 6-179 degrees). And in the intermediate state, the electronic device 101 may not be in either the open state or the closed state.

The electronic device 101 may include a first display 230 (e.g. main display) (e.g. display device 160 in FIG. 1) on the first surface 211 and the second surface 221 that correspond to the front surface 200 of the electronic device. The first display 230 may be disposed over substantially (e.g. more than 90%) the entirety of the front surface 200. The first display 230 may be a flexible display, at least a partial region of which is transformable into a flat surface or a curved surface. The first display 230 may be folded to the left and right with respect to a folding axis (e.g. axis A). The first display 230 may include a first display area corresponding to the first surface 211 and a second display area corresponding to the second surface 221. In addition, the electronic device 101 may include a first camera 214 on the second surface 221. FIG. 2A illustrates one first camera 214, but a plurality of first cameras 214 may be arranged. FIG. 2A illustrates the first camera 214 disposed on the second surface 221, but the first camera 214 may be disposed on the first surface 211. Although not illustrated, the electronic device 101 may further include a sensor module (e.g. sensor module 176 in FIG. 1) disposed on the front surface 200.

In addition, the electronic device 101 may include a second display 240 (e.g. sub display, cover display) (e.g. display device 160 in FIG. 1) on a part of the rear surface 250 of the electronic device. The second display 240 may be disposed on at least a part of the third surface 213 of the electronic device 101. The electronic device 101 may include a plurality of cameras (e.g. elements indicated by reference numerals 215, 217, 219, and 225) on the rear surface 250 of the electronic device. For example, the electronic device 101 may include a second camera 215, a third camera 217, and a fourth camera 219 which are disposed on the fourth surface 223, and a fifth camera 225 disposed on the third surface 213. According to different embodiments, the second camera 215, the third camera 217, the fourth camera 219, and the fifth camera 225 may have identical or different characteristics (e.g. angle of view, resolution). For example, the angle of view of the second camera 215 may exceed 125 degrees (e.g. ultra-wide), the angle of view of the third camera 217 may be 90-125 degrees (e.g. wide), the fourth camera 219 may have an angle of view of 90 degrees with 2× zoom (e.g. telephoto), and the fifth camera 225 may have an angle of view of 90 degrees. The electronic device 101 may further include a sensor area 241 on the fourth surface 223. In the sensor area 241, infrared sensor, fingerprint sensor, or illumination sensor (e.g. the sensor module 176 in FIG. 1) may be disposed.

According to an embodiment, if the electronic device 101 is in the open state (e.g. FIG. 2A), the first display 230 may be turned on (or activated), and the second display 240 may be turned off (or deactivated). If a user input (e.g. touch, button selection) is not detected during a predetermined time interval (e.g. 5 seconds, 10 seconds, 1 minute) in while the first display 230 is in the ON state, the electronic device 101 may turn off the first display 230. If a user input (e.g. touch, button selection) on the second display 240 is detected while the second display 240 is in the OFF state, the electronic device 101 may turn on the second display 240. For this operation, while the second display 240 is in the OFF state, its touch panel may still be activated occasionally at regular intervals to detect the user input. According to an embodiment, if the second display 240 is turned on, the first display 230 may be turned off. However, even though the second display 240 is turned on, the electronic device 101 may maintain the ON state of the first display 230 for a predetermined time interval, and then after the passage of the predetermined time interval, if a user input is not detected on the first display 230, the electronic device may turn off the first display 230.

FIG. 2B is a view illustrating a closed state of an electronic device according to an embodiment.

Referring to FIG. 2B, an electronic device (e.g. electronic device 101 in FIG. 1) according to an embodiment may include a hinge structure 260 around a folding axis (e.g. axis A) to allow the folded state (e.g. closed state) of the front surface 200 of the electronic device 101. FIG. 2B illustrates the third surface 213 of the first housing 210 and the fourth surface 223 of the second housing 220 when the electronic device 101 is in the closed state.

According to an embodiment, if the electronic device 101 is in the closed state, the first display 230 may be turned off, and the second display 240 may be turned on. If a user input is not detected during a predetermined time interval when the second display 240 is on, the electronic device 101 may turn off the second display 240. When the electronic device 101 is in the closed state and the second display 240 is turned off, if a button disposed (or mounted) on the electronic device 101 is selected, the electronic device 101 may turn on the second display 240. When the electronic device 101 is in the closed state and the second display 240 is turned off, if a user input on the second display 240 is detected, the electronic device 101 may turn on the second display 240.

Figure 3:
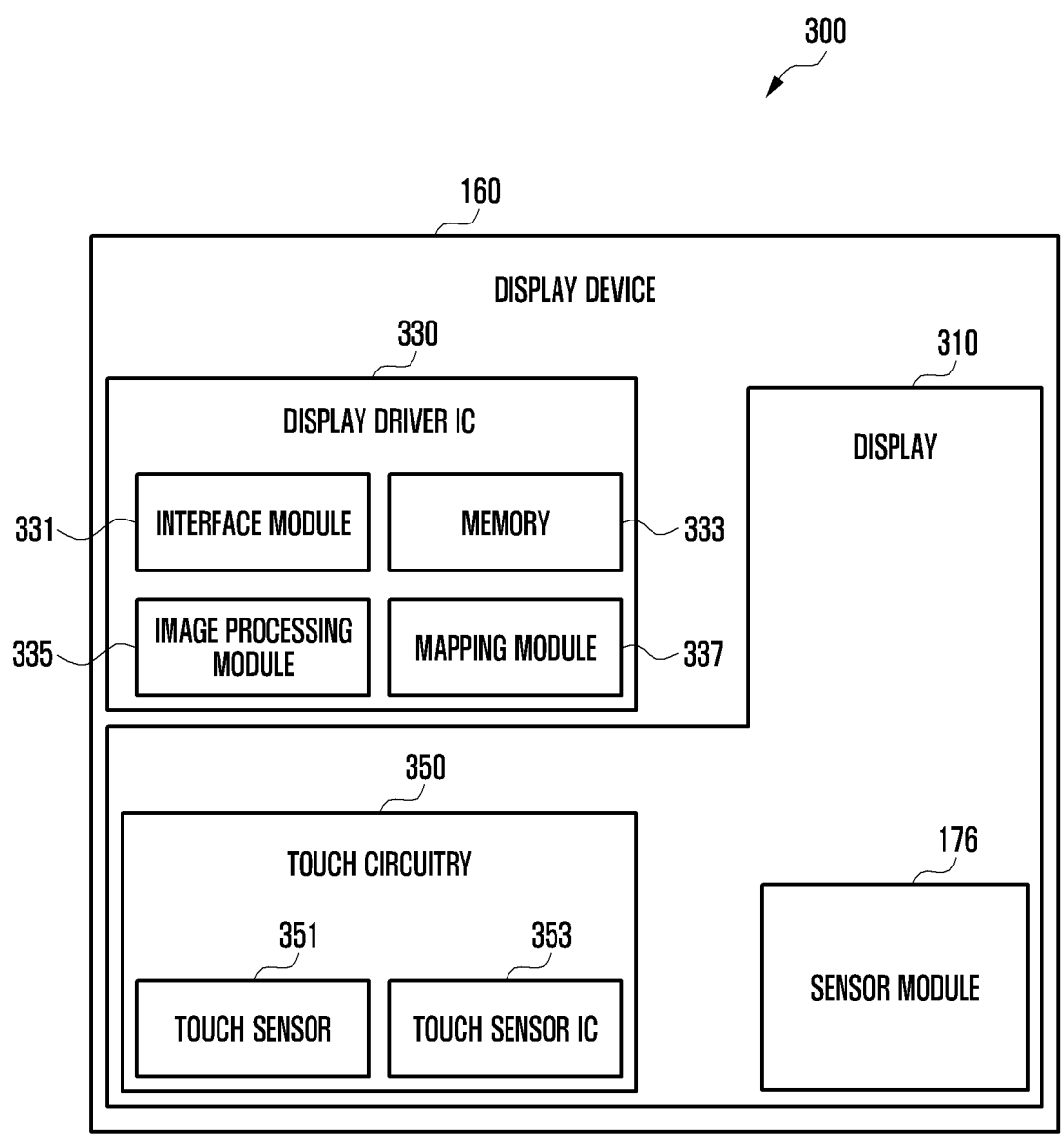
FIG. 3 illustrates a block diagram of a display device according to various embodiments.

FIG. 3 illustrates a block diagram 300 of a display device 160 according to various embodiments.

Referring to FIG. 3, the display device 160 may include a display 310 and a display driver IC 330 (DDI, display driver IC) configured to control the display. The DDI 330 may include an interface module 331, a memory 333 (e.g. buffer memory), an image processing module 335, or a mapping module 337.

The DDI 330 may receive image information that contains image data or an image control signal corresponding to a command to control the image data from another component of the electronic device 101 via the interface module 331. For example, image information may be received from a processor 120 (e.g. main processor 121) (e.g. application processor) or an auxiliary processor 123 (e.g. graphic processing device) operated independently from a function of the main processor 121. The DDI 330 may communicate with a touch circuit 350 or a sensor module 176 through the interface module 331. The DDI 330 may store at least a part of the received image information in the memory 333, for example, in the units of frames.

The image processing module 335 may perform pre-processing or post-processing (e.g. adjustment of resolution, brightness, or size), for example, on at least a part of the image data, at least based on a characteristic of the image data or a characteristic of the display 310.

The mapping module 337 may generate a voltage value or a current value corresponding to the image data for which pre-processing or post-processing has been performed through the image processing module 335. According to an embodiment, generation of a voltage value or a current value may be performed, for example, at least partially based on an attribute (e.g. array of pixels (RGB stripe or Pentile structure), or size of each of subpixels) of pixels of the display 310. At least a part of pixels of the display 310 may be operated, for example, at least partially based on the voltage value or the current value to allow visual information (e.g. text, image, or icon) corresponding to the image data to be displayed through the display 310.

According to an embodiment, the display device 160 may further include the touch circuit 350. The touch circuit 350 may include a touch sensor 351 and a touch sensor IC 353 configured to control the touch sensor. The touch sensor IC 353 may control the touch sensor 351, for example, to sense a touch input or a hovering input on a particular position of the display 310. For example, the touch sensor IC 353 may sense a touch input or hovering input by measuring a change of a signal (e.g. voltage, quantity of light, resistance, or quantity of electric charge) relating to a particular position of the display 310. The touch sensor IC 353 may provide information (e.g. position, area, pressure, or time) relating to the sensed touch input or hovering input to the processor 120. According to an embodiment, at least a part (e.g. touch sensor IC 353) of the touch circuit 350 may be included as a part of the DDI 330 or display 310, or a part of another element (e.g. auxiliary processor 123) disposed outside the display device 160.

According to an embodiment, the display device 160 may further include at least one sensor (e.g. fingerprint sensor, iris sensor, pressure sensor, or illumination sensor) of the sensor module 176 or a control circuit for the sensor. In this case, the at least one sensor or control circuit therefor may be embedded in a part (e.g. display 310 or DDI 330) of the display device 160 or a part of the touch circuit 350. For example, if the sensor module 176 embedded in the display device 160 includes a biosensor (e.g. fingerprint sensor), the biosensor may obtain biological information (e.g. fingerprint image) associated with a touch input through a partial area of the display 310. For another example, if the sensor module 176 embedded in the display device 160 includes a pressure sensor, the pressure sensor may obtain pressure information associated with a touch input through a partial area or the entire area of the display 310. According to an embodiment, the touch sensor 351 or the sensor module 176 may be disposed between pixels of a pixel layer of the display 310, on the pixel layer, or under the pixel layer.

A foldable electronic device (e.g. electronic device 101 in FIG. 1) according to various embodiments may include: a first housing (e.g. first housing 210 in FIGS. 2A and 2B) including a first surface (e.g. first surface 211 in FIG. 2A) and a third surface (e.g. third surface 213 in FIGS. 2A and 2B) opposite to the first surface; a second housing (e.g. second housing 220 in FIGS. 2A and 2B) including a second surface (e.g. second surface 221 in FIG. 2A) extending from the first surface and a fourth surface (e.g. fourth surface 223 in FIGS. 2A and 2B) opposite to the second surface; a first display (e.g. first display 230 in FIGS. 2A and 2B) disposed on the first surface and the second surface; a second display (e.g. second display 240 in FIGS. 2A and 2B) disposed on at least a part of the third surface; at least one first camera module (e.g. fifth camera 225 in FIGS. 2A and 2B) disposed on at least a part of the third surface; a plurality of second camera modules (e.g. second camera 215, third camera 217, and fourth camera 219 in FIGS. 2A and 2B) disposed on at least a part of the fourth surface; a memory (e.g. memory 130 in FIG. 1); and a processor (e.g. processor 120 in FIG. 1), wherein the processor is configured to: when the foldable electronic device is in a closed state, display a preview image obtained from the at least one first camera module on the second display; detect a user input for changing an image capturing mode; sense whether a state of the foldable electronic device is changed, in response to detecting the user input for changing the image capturing mode; and when the state of the foldable electronic device is changed, display information relating to the plurality of second camera modules on the second display. The processor may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed under the provisions of 35 U.S.C. 112(f), unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

The processor may be configured to, when the foldable electronic device is changed from the closed state to an open state, display a plurality of camera objects corresponding to the plurality of second camera modules on the second display.

Each of the plurality of second camera modules may have different camera characteristics, and the processor may be configured to display objects included in a plurality of camera objects to have different shapes or sizes corresponding to the different camera characteristics.

The processor may be configured to select at least one camera module among the plurality of second camera modules, based on a user input of selecting at least one object included in the plurality of camera objects.

The processor may be configured to: when the state of the foldable electronic device is changed, activate at least one camera module among the plurality of second camera modules; and display a preview image obtained from the activated camera module, and a plurality of camera objects corresponding to the plurality of second camera modules on the second display.

The processor may be configured to, when the state of the foldable electronic device is changed, turn off the at least one first camera module and activate at least one camera module among the plurality of second camera modules.

The processor may be configured to: when the user input for changing the image capturing mode is detected, provide an image capturing guide message.

The processor may be configured to: when the state of the foldable electronic device is changed, display a plurality of camera objects corresponding to the at least one first camera module and the plurality of second camera modules on the second display.

The processor may be configured to: when the state of the foldable electronic device is changed, activate at least one camera module among the plurality of second camera modules; and display a preview image obtained from the activated camera module, and a plurality of camera objects corresponding to the at least one first camera module and the plurality of second camera modules on the second display.

The processor may be configured to: when the state of the foldable electronic device is changed, maintain an OFF state of the first display.

The processor may be configured to: when the state of the foldable electronic device is changed, activate at least one third camera module among the plurality of second camera modules; display a first preview image obtained from the activated third camera module, and a first plurality of camera objects corresponding to the plurality of second camera modules on the second display; and when a first object corresponding to a fourth camera module among the plurality of camera objects is selected, display a second preview image obtained from the fourth camera module, and a second plurality of camera objects corresponding to the plurality of second camera modules on the second display.

The first preview image and the second preview image may be different, and the first plurality of camera objects and the second plurality of camera objects may be different.

The first plurality of camera objects may be configured to indicate that a second object corresponding to the third camera module is selected, and the second plurality of camera objects may be configured to indicate that the first object corresponding to the fourth camera module is selected.

A foldable electronic device (e.g. electronic device 101 in FIG. 1) according to various embodiments may include: a first surface (e.g. third surface 213 in FIGS. 2A and 2B) oriented in a first direction in a folded state and a second surface (e.g. fourth surface 223 in FIGS. 2A and 2B) oriented in a second direction opposite to the first direction; a first display (e.g. second display 240 in FIGS. 2A and 2B) disposed on the first surface; at least one first camera module (e.g. fifth camera 225 in FIGS. 2A and 2B) disposed on the first surface; a plurality of second camera modules (e.g. second camera 215, third camera 217, and fourth camera 219 in FIGS. 2A and 2B) disposed on the second surface; a memory (e.g. memory 130 in FIG. 1); and a processor (e.g. processor 120 in FIG. 1), wherein the processor is configured to: when the foldable electronic device is in the folded state, display a preview image obtained from the at least one first camera module on the first display; detect a user input for changing an image capturing mode; sense whether the foldable electronic device is unfolded, in response to detecting the user input for changing the image capturing mode; and when the foldable electronic device is unfolded, display information relating to the plurality of second camera modules on the first display.

The foldable electronic device may include a third surface (e.g. first surface 211 in FIGS. 2A and 2B) and a fourth surface (e.g. second surface 221 in FIGS. 2A and 2B), and further include a second display (e.g. first display 230 in FIGS. 2A and 2B) disposed on the third surface and the fourth surface, where the third surface faces the fourth surface in the folded state.

Figure 4:
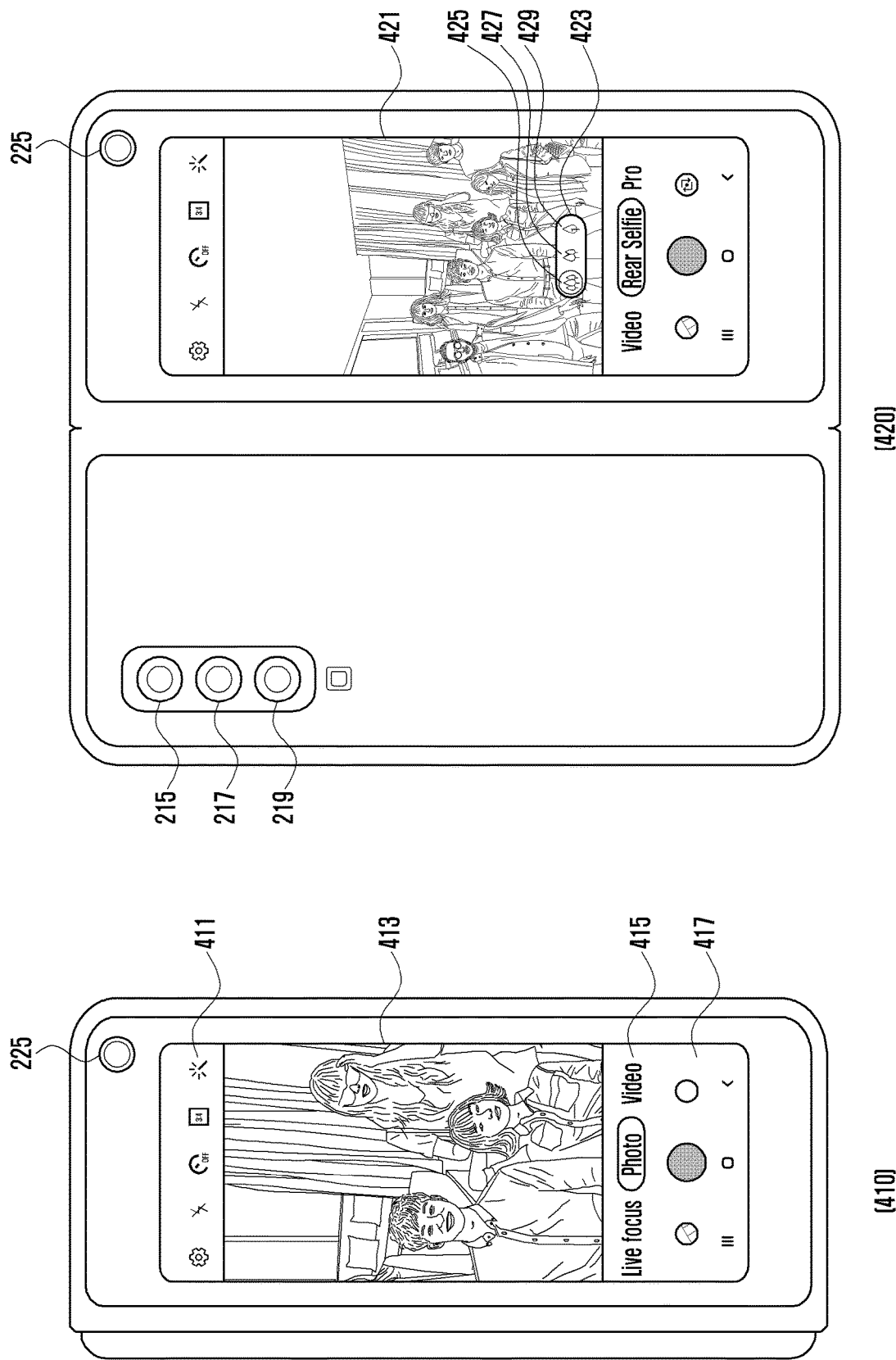
FIG. 4 is a view illustrating an example of a user interface related to selfie capturing of an electronic device according to an embodiment.

FIG. 4 is a view illustrating an example of a user interface related to selfie capturing of an electronic device according to an embodiment.

Referring to FIG. 4, an electronic device (e.g. electronic device 101 in FIG. 1) according to an embodiment may display an execution screen 410 of a camera application on the second display (e.g. second display 240 in FIGS. 2A and 2B) while the electronic device is in the closed state (e.g. FIG. 2B). The execution screen 410 may include a preview image 413 obtained from one (e.g. fifth camera 225) among a plurality of cameras (e.g. second camera 215 to fifth camera 225 in FIGS. 2A and 2B) included (or mounted) in the electronic device 101. The execution screen 410 may further include configuration information 411, image capturing mode information 415, and image capturing control information 417. For example, the configuration information 411 may include at least one of various pieces of information (e.g. photo size, video size, timer) relating to a configuration of the fifth camera 225, ON/OFF of a flash, a screen view configuration, or camera change (e.g. front/rear camera change). The image capturing mode information 415 relates to an image capturing mode, and may include, for example, at least one of Normal (or Auto), Video, Selfie, Rear Selfie, Live focus, Slow Motion, Pro, or Panorama. The image capturing control information 417 may include at least one of an image capturing button, a recent photo view button, or a previous photo view button. The execution screen 410 may be displayed when a selfie is to be taken with the fifth camera 225 disposed on the third surface 213 of the first housing 210 if the electronic device 101 is in the closed state.

According to an embodiment, while the electronic device 101 is displaying the execution screen 410 in the closed state, the electronic device 101 may be changed (or switched) to the open state (e.g. FIG. 2A). The electronic device 101 may also be manipulated into the intermediate state, and may detect as such. If the electronic device 101 is changed from the closed state to the open state, the electronic device 101 may activate at least one of a plurality of cameras (e.g. second camera 215 to fourth camera 219) disposed on the fourth surface 223 of the second housing 220. If a user input is detected on the image capturing mode information 415 displayed on the execution screen 410 when the electronic device 101 is in the closed state, the electronic device 101 may activate at least one of the plurality of cameras. For example, if the image capturing mode information 415 is changed from "Selfie" to "Rear Selfie (or rear surface selfie)" according to a user input when the electronic device 101 is in the closed state, and then the electronic device 101 is changed to the open state, the electronic device 101 may activate at least one of the plurality of cameras. In this example, the electronic device 101 may activate the second camera 215. If the second camera 215 is activated, the electronic device 101 may deactivate (or turn off) the fifth camera 225.

According to an embodiment, the electronic device 101 may display an execution screen 420 of the camera application on the second display 240 in the open state. The execution screen 420 may include a preview image 421 obtained from the second camera 215 and a plurality of camera objects 423. The plurality of camera objects 423 may be displayed on the preview image 421, that is, overlapping with the preview image. The plurality of camera objects 423 may be objects (e.g. images or icons) for selecting the second camera 215, the third camera 217, or the fourth camera 219. For example, the plurality of camera objects 423 may include a first object 425 corresponding to the second camera 215, a second object 427 corresponding to the third camera 217, or a third object 429 corresponding to the fourth camera 219.

The second camera 215, the third camera 217, or the fourth camera 219 may have different or identical characteristics. The first object 425 to third object 429 may have different shapes or sizes. The first object 425 to third object 429 may have different shapes or sizes to reflect the differences in camera characteristics. The plurality of camera objects 423 may display an object (e.g. first object 425) corresponding to an activated camera (e.g. second camera 215) and an object (e.g. second object 427 and third object 429) corresponding to an deactivated camera (e.g. third camera 217 and fourth camera 219) such that the objects are different from each other.

According to an embodiment, if the image capturing mode information 415 is changed according to a user input, the electronic device 101 may change the image capturing mode information displayed on an execution screen. For example, if the image capturing mode information 415 is configured to be "Selfie" when the electronic device 101 is in the closed state, the electronic device may display Live Focus, Normal, and Video as the image capturing mode information 415. If the image capturing mode information 415 is changed from "Selfie" to "Rear Selfie" according to a user input when the electronic device 101 is in the closed state, the electronic device may display Video, Real Selfie, and Pro as the image capturing mode information 415. If the electronic device 101 is changed from the closed state the open state, the electronic device 101 may change the image capturing mode information 415.

Figure 5:
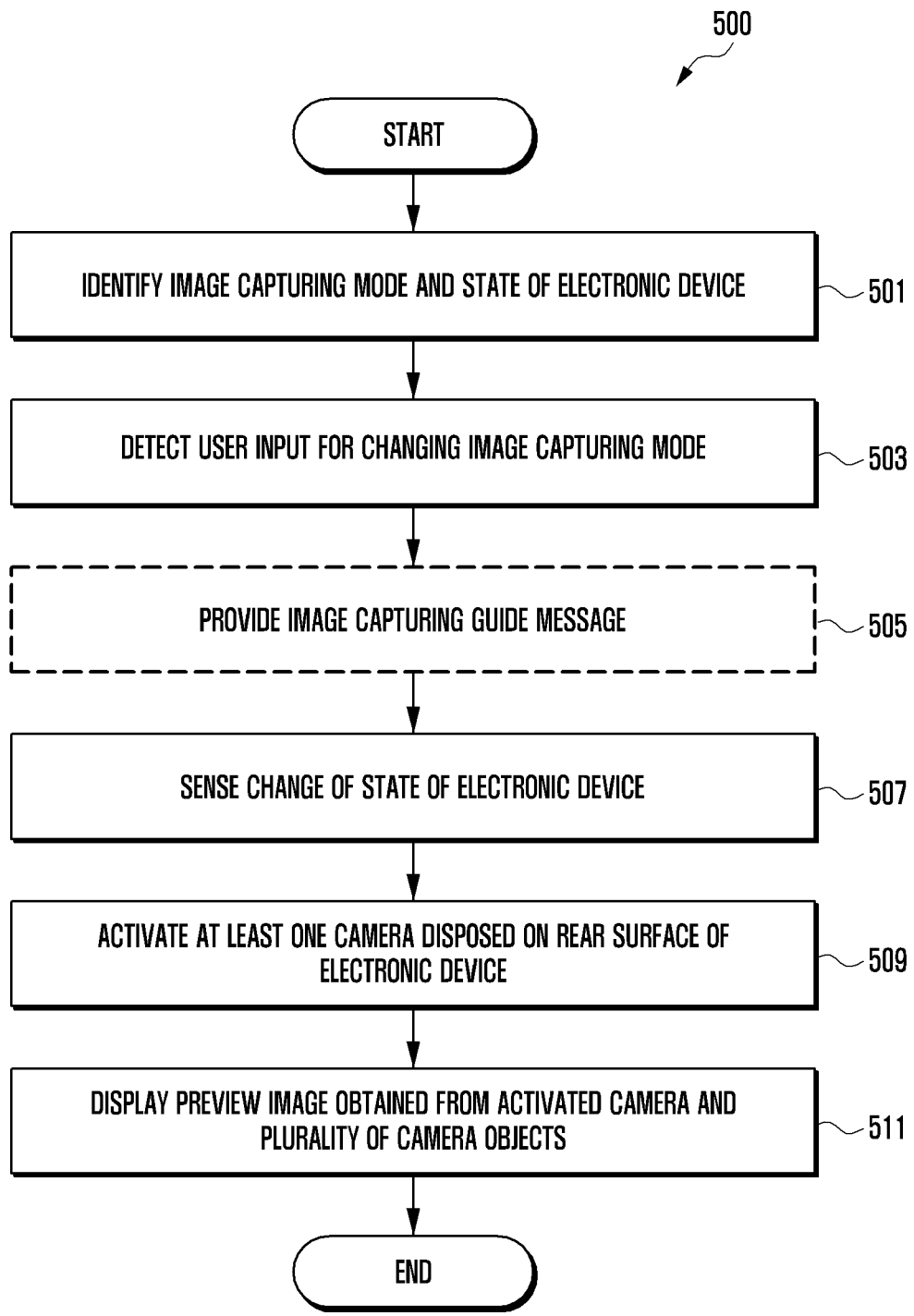
FIG. 5 is a flowchart illustrating an operation method of an electronic device according to an embodiment.

FIG. 5 is a flowchart illustrating an operation method of an electronic device according to an embodiment.

Referring to FIG. 5, in operation 501, a processor (e.g. processor 120 in FIG. 2) of an electronic device (e.g. electronic device 101 in FIG. 1) according to an embodiment may identify an image capturing mode and a state of the electronic device 101. In operation 501, the processor 120 may execute a camera application according to a request of the user, and may display a preview image obtained by the executed camera application on a display (e.g. first display 230 or second display 240 in FIGS. 2A and 2B). The image capturing mode relates to an image capturing mode of the camera, and may include, for example, Normal, Video, Selfie, Rear Selfie, Live focus, Slow Motion, Pro, or Panorama. The state of the electronic device 101 may be at least one of the open state, the closed state, or the intermediate state. In operation 501 in this example, the image capturing mode may be "Selfie," and the state of the electronic device 101 may be the closed state.

The closed state (e.g. state of electronic device 101 in FIG. 2B) may mean that an angle between a first housing (e.g. first housing 210 in FIGS. 2A and 2B) and a second housing (e.g. second housing 220 in FIGS. 2A and 2B) of the electronic device 101 is a narrow angle (e.g. 0-5 degrees). And in the closed state, a first surface 211 of the first housing 210 and a second surface 221 of the second housing 220 may face each other. In the selfie capturing mode, an image may be captured by a camera (e.g. fifth camera 225 in FIGS. 2A and 2B) disposed on a third surface 213 included in the first housing 210 of the electronic device 101 when the electronic device 101 is in the closed state. If a selfie is to be taken when the electronic device 101 is in the closed state, the processor 120 may display a preview image obtained from the fifth camera 225 through the second display 240.

In operation 503, the processor 120 may detect a user input for changing the image capturing mode. The user input may be detected on the second display 240 of the electronic device 101 when the electronic device 101 is in the closed state. For example, the user input may occur where the image capturing mode information (e.g. image capturing mode information 415 in FIG. 4) on an execution screen (e.g. execution screen 410 in FIG. 4) of the camera application is displayed. In operation 503, the processor 120 may detect the user input for changing the image capturing mode to "Rear Selfie" when the image capturing mode was previously configured to be "Selfie".

In operation 505, the processor 120 may provide an image capturing guide message. The image capturing guide message may be designed to guide the user to change the state of the electronic device 101 in order to capture the image in the Rear Selfie mode. The image capturing guide message may include at least one of text, image, or video. For example, the processor 120 may guide the user to unfold (or open) the electronic device 101 while the device is in the closed state to change the electronic device 101 to the open state. The image capturing guide message may notify the user that a camera (e.g. second camera 215 to fourth camera 219 in FIGS. 2A and 2B) is disposed on a rear surface (e.g. fourth surface 223) of the electronic device 101. The image capturing guide message may include a camera position notification image (e.g. notification image 633 in FIG. 6C) and text (e.g. notification text 635 in FIG. 6C). According to another embodiment, the processor 120 may not provide the image capturing guide message, depending on the implementation of the electronic device 101. That is, operation 505 can be omitted. For example, in the Rear Selfie image-capturing mode, the processor 120 may provide the image capturing guide message a preconfigured number of times (e.g. five times, ten times), and after the message is provided for the preconfigured number of times, the processor may not further provide the image capturing guide message.

In operation 507, the processor 120 may sense a change of the state of the electronic device 101. The processor 120 may sense (or detect) whether the electronic device 101 is changed to the open state by the user. The open state (e.g. state of electronic device 101 in FIG. 2A) may mean that the angle between the first housing 210 and the second housing 220 is 180 degrees, such that the first surface 211 of the first housing 210 and the second surface 221 of the second housing 220 may be arranged to be oriented in the identical direction. The processor 120 may also sense the intermediate state, and determine that for the purposes of the Rear Selfie mode, the intermediate mode may suffice as the open state. For example, the user may open the electronic device 101 to face the rear surface 250 of the electronic device 101 so as to capture an image in the Rear Selfie mode. The user may open the electronic device 101 according to the image capturing guide message to face the rear surface 250 of the electronic device 101. The user may then use a plurality of cameras (e.g. second camera 215 to fourth camera 219 in FIGS. 2A and 2B) disposed on the rear surface 250 of the electronic device 101 to take an image of himself or herself.

According to an embodiment, the processor 120 may sense gripping or moving of the electronic device 101 by the user, based on at least one sensor (e.g. sensor module 176 in FIG. 1). Such grip or movement information may be used to identify the change from the closed state to the open state. For example, at least one sensor may be located in the first housing 210 or the second housing 220 and may be operably connected to the processor 120. According to an embodiment, at least one sensor may sense gripping or moving of the electronic device 101 by the user, and may provide data (e.g. sensor data) relating to the sensed state to the processor 120.

In operation 509, the processor 120 may activate (or drive) at least one camera disposed on the rear surface 250 of the electronic device 101. The processor 120 may activate at least one camera (e.g. second camera 215) among a plurality of cameras (e.g. second camera 215 to fourth camera 219 in FIGS. 2A and 2B) disposed on the rear surface 250 of the electronic device 101. The activating of the camera may mean driving the second camera 215 to obtain a preview image from the second camera 215. If the second camera 215 is activated, the electronic device 101 may deactivate (or turn off) the fifth camera 225 having been activated in operation 501. According to different embodiments, the processor 120 may activate a camera (e.g. second camera 215) among second camera 215 to fourth camera 219, or may activate multiple cameras.

In operation 511, the processor 120 may display a preview image obtained from the activated camera and a plurality of camera objects. The processor 120 may display a preview image (e.g. preview image 421 in FIG. 4) obtained from the second camera 215 and a plurality of camera objects (e.g. a plurality of camera objects 423 in FIG. 4) on the second display 240. The user may select at least one object among the plurality of camera objects 423 to select at least one other camera (e.g. third camera 217) among the plurality of cameras (e.g. second camera 215 to fourth camera 219 in FIGS. 2A and 2B) disposed on the rear surface 250 of the electronic device 101.

FIGS. 6A-6E are views illustrating an example of a user interface related to selfie capturing of an electronic device according to an embodiment.

Figure 6A:
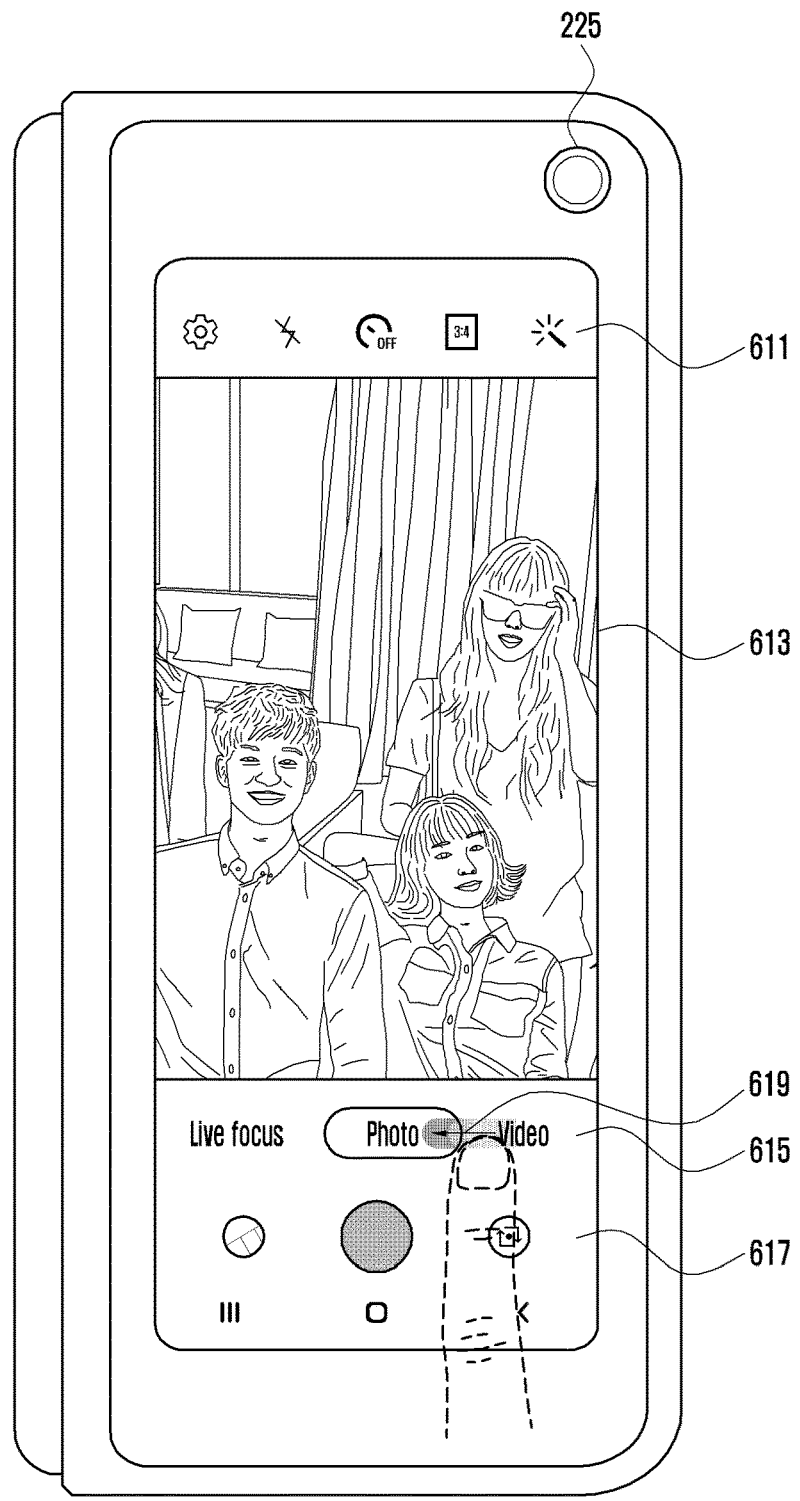
FIGS. 6A-6E are views illustrating an example of a user interface related to selfie capturing of an electronic device according to an embodiment.

FIG. 6A illustrates an example of detecting a user input by an electronic device 101 in the closed state.

Referring to FIG. 6A, an electronic device (e.g. electronic device 101 in FIG. 1) according to an embodiment may display an execution screen 610 of a camera application on a second display (e.g. second display 240 in FIGS. 2A and 2B) in a closed state (e.g. FIG. 2B). The execution screen 610 may include a preview image 613 obtained from one (e.g. fifth camera 225) among a plurality of cameras (e.g. second camera 215 to fifth camera 225 in FIGS. 2A and 2B) included (or mounted) in the electronic device 101. The execution screen 610 may further include configuration information 611, image capturing mode information 615, and image capturing control information 617. The execution screen 610 is identical or similar to the execution screen 410 in FIG. 4, and thus the detailed description of the execution screen will be omitted. A processor (e.g. processor 120 in FIG. 1) of the electronic device 101 may detect a user input 619 for changing an image capturing mode on the execution screen 610. The user input 619 may change the image capturing mode from the selfie (or normal) mode to "Rear Selfie." The user input 619 may correspond to touching and dragging on the icon corresponding to the selfie taking mode and then releasing of the touch on the icon corresponding to the rear selfie mode.

Figure 6B:
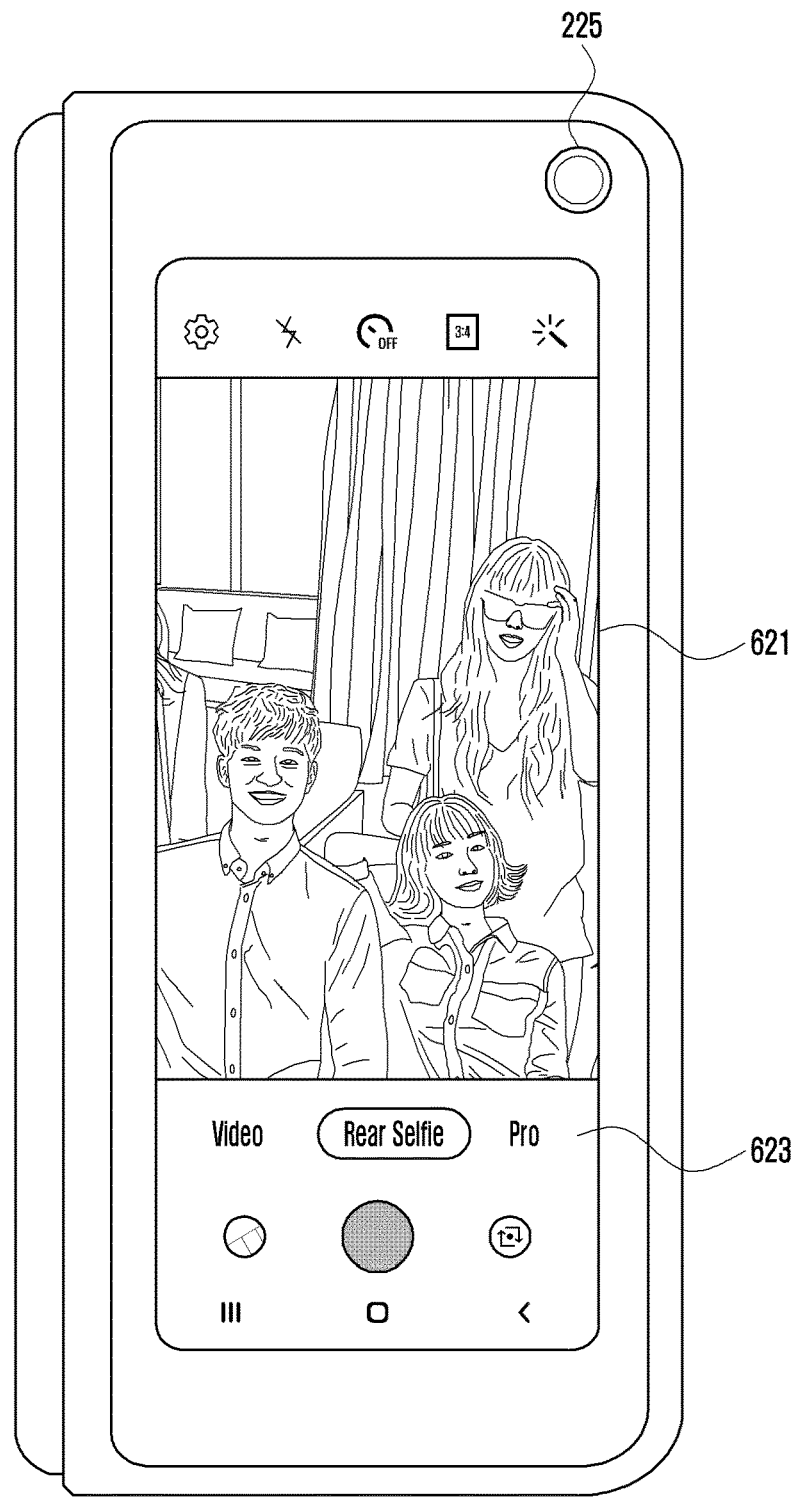

FIG. 6B illustrates an example in which an image capturing mode of an electronic device 101 in the closed state is changed.

Referring to FIG. 6B, the processor 120 of the electronic device 101 may change the image capturing mode in the closed state (e.g. FIG. 2B), based on the user input. The processor 120 may display, on the second display 240, an execution screen 620 in which an image capturing mode is changed to Rear Selfie 623, based on the user input 619 in FIG. 6A. The execution screen 620 may include a preview image 621 obtained from the fifth camera 225 among a plurality of cameras (e.g. second camera 215 to fifth camera 225 in FIGS. 2A and 2B). If image capturing mode information (e.g. image capturing mode information 615 in FIG. 6A) is changed according to the user input, the processor 120 may change image capturing mode information displayed on the execution screen 620. For example, the processor 120 may display the image capturing mode information 615 displayed on the execution screen 610, to be Live Focus, Normal, and Video, and may display image capturing mode information displayed on the execution screen 620, to be Video, Rear Selfie, and Pro.

Figure 6C:
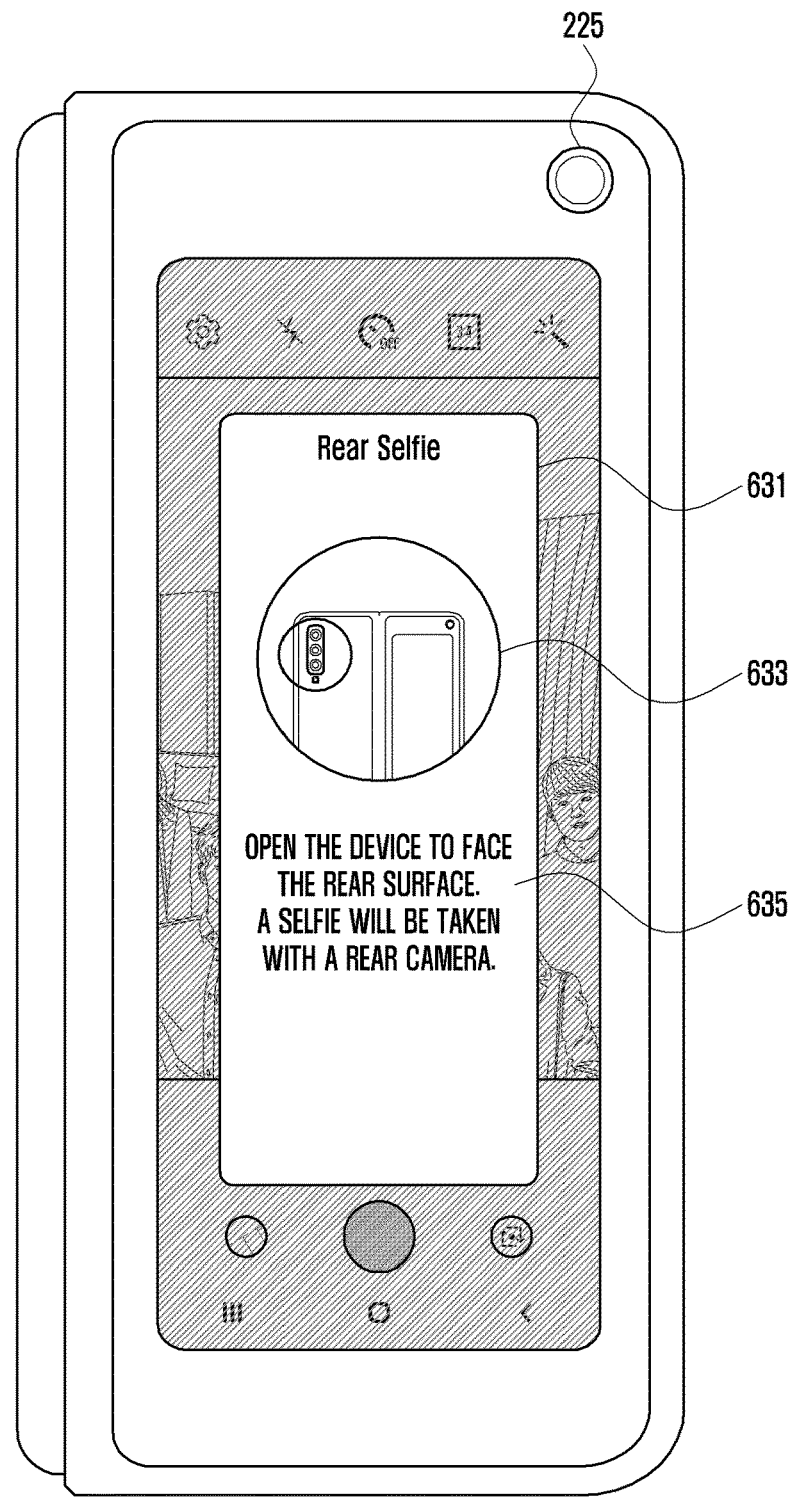

FIG. 6C illustrates an example of providing an image capturing guide message in an electronic device 101.

Referring to FIG. 6C, the processor 120 of the electronic device 101 may provide an image capturing guide message 631 if the image capturing mode is changed to Rear Selfie 623 in the closed state (e.g. FIG. 2B). The processor 120 may display an execution screen 630 including the image capturing guide message 631 on the second display 240. The execution screen 630 may display the image capturing guide message 631 on the execution screen 620 in FIG. 6B. The image capturing guide message 631 may include at least one of text, image, or video. The image capturing guide message 631 may include a camera position notification image 633 and notification text 635. The camera position notification image 633 may notify the user that image capturing is possible in the Rear Selfie mode through a camera (e.g. second camera 215 to fourth camera 219 in FIGS. 2A and 2B) disposed on the rear surface (e.g. fourth surface 223) of the electronic device 101. The notification text 635 may guide the user to open the electronic device 101 so that he or she faces the rear surface of the electronic device 101. According to an embodiment, the processor 120 may activate the fifth camera 225 while displaying the image capturing guide message 631. The processor 120 may prepare driving of the second camera 215 to the fourth camera 219 disposed on the rear surface 250 of the electronic device 101 while displaying the image capturing guide message 631.

Figure 6D:
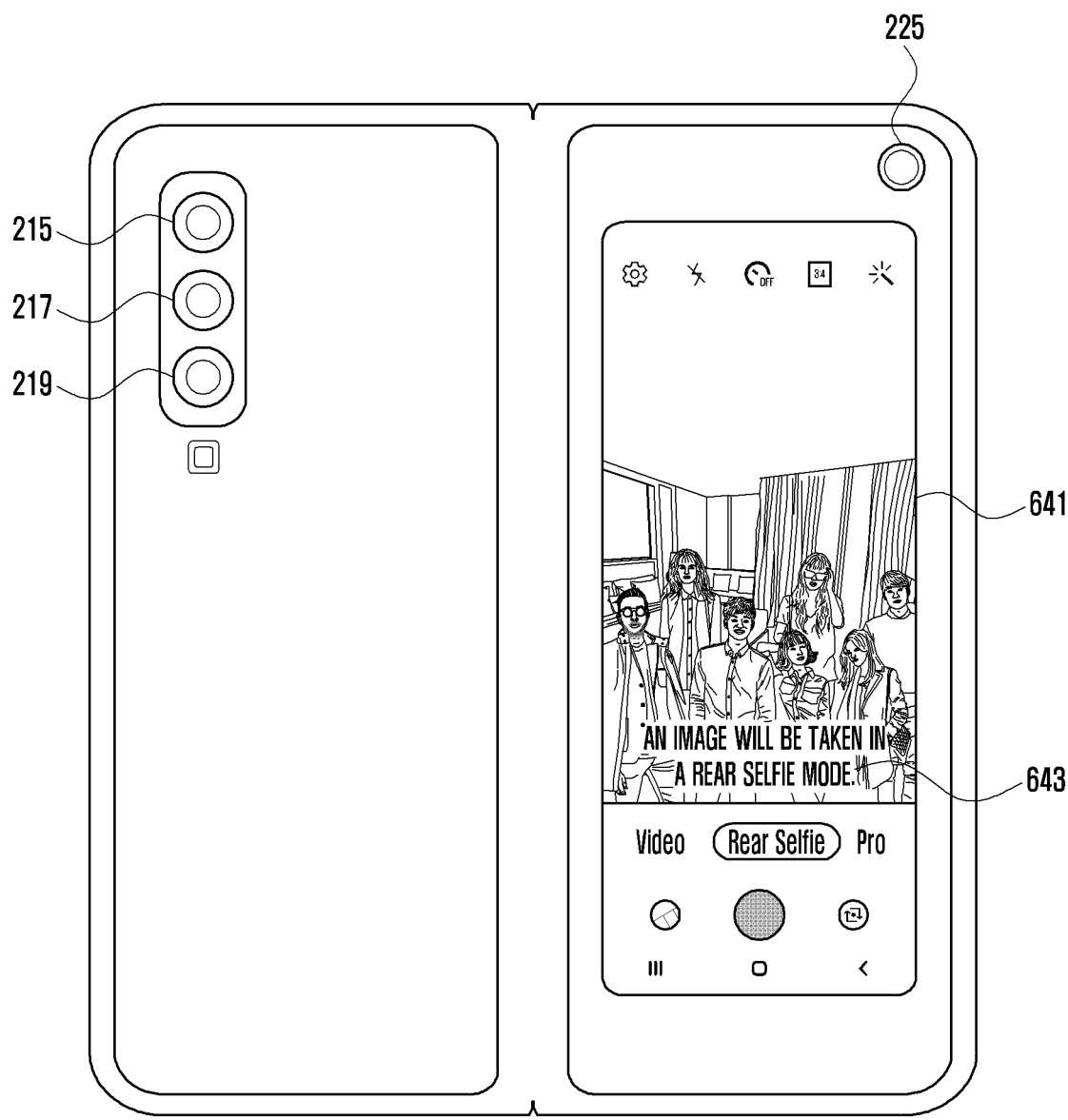

FIG. 6D illustrates an example of capturing an image in a Rear Selfie mode by an electronic device 101.

Referring to FIG. 6D, the processor 120 of the electronic device 101 may provide an execution screen 640 for capturing an image in the Rear Selfie mode in the open state (e.g. FIG. 2A). The execution screen 640 may include a preview image 641 obtained from at least one camera (e.g. second camera 215) among the second camera 215 to the fourth camera 219 disposed on the rear surface 250 of the electronic device 101. The execution screen 640 may include a message 643 notifying the user that image capturing is performed in the Rear Selfie mode due to the change of the state of the electronic device 101. If the execution screen 630 in FIG. 6C is changed to the execution screen 640 in FIG. 6D, the processor 120 may activate (or drive) the second camera 215 and deactivate (turn off) the fifth camera 225. The processor 120 may display the message 643 during a preconfigured time interval (e.g. 3 seconds, 5 seconds), and then may remove the message 643 after passage of the preconfigured time interval. After removing the message 643, the processor 120 may display a plurality of camera objects (e.g. a plurality of camera objects 423 in FIG. 4) similar to the execution screen 420 in FIG. 4.

Figure 6E:
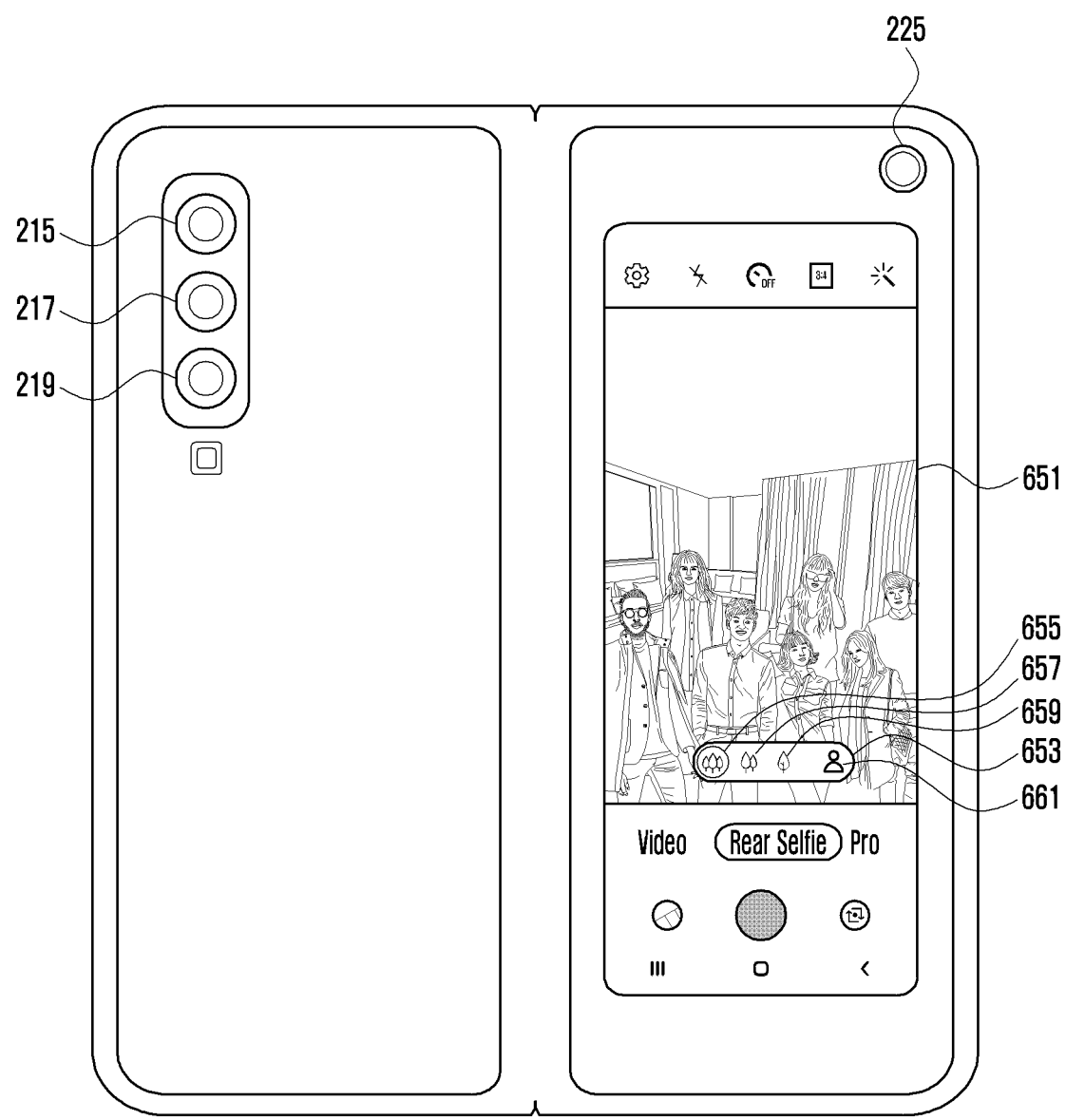

FIG. 6E illustrates another example of capturing an image in a Rear Selfie mode by an electronic device 101.

Referring to FIG. 6E, the processor 120 of the electronic device 101 may provide an execution screen 650 for capturing an image in the Rear Selfie mode in the open state (e.g. FIG. 2A). The execution screen 650 may include a preview image 651 obtained from at least one camera (e.g. second camera 215) among the second camera 215 to the fifth camera 225 disposed on the rear surface 250 of the electronic device 101. The execution screen 650 may also include a plurality of camera objects 653. The plurality of camera objects 653 may be displayed on the preview image 651, thus overlapping with the preview image. The plurality of camera objects 653 may be objects (or images, icons) corresponding to the second camera 215, the third camera 217, the fourth camera 219, or the fifth camera 225 to enable selection thereof. For example, the plurality of camera objects 653 may include a first object 655 corresponding to the second camera 215, a second object 657 corresponding to the third camera 217, a third object 659 corresponding to the fourth camera 219, or a fourth object 661 corresponding to the fifth camera 225. The first object 655 to fourth object 661 may have different shapes or sizes to reflect the different cameras. The plurality of camera objects 653 may display an object (e.g. first object 655) corresponding to an activated camera (e.g. second camera 215) and an object (e.g. second object 657, third object 659, and fourth object 661) corresponding to an deactivated camera (e.g. third camera 217, fourth camera 219, and fifth camera 225) such that the objects are different from each other.

FIG. 7 is a flowchart illustrating an image capturing control method of an electronic device according to an embodiment.

Referring to FIG. 7, in operation 701, a processor (e.g. processor 120 in FIG. 2) of an electronic device (e.g. electronic device 101 in FIG. 1) according to an embodiment may display a first preview image obtained from a first camera (e.g. second camera 215 in FIGS. 2A and 2B) and a plurality of camera objects. The processor 120 may provide a first execution screen including the first preview image and the plurality of camera objects. In operation 701, the electronic device 101 may display a first execution screen (e.g. execution screen 420 in FIG. 4 or execution screen 650 in FIG. 6E) on a second display (e.g. second display 240 in FIGS. 2A and 2B) while the electronic device is in the open state (e.g. FIG. 2A). The processor 120 may obtain a first preview image from a second camera 215 among a plurality of cameras (second camera 215, third camera 217, fourth camera 219, or fifth camera 225) disposed on a rear surface (e.g. rear surface 250 in FIGS. 2A and 2B) of the electronic device 101. The first preview image may be the preview image 421 in FIG. 4 or the preview image 652 in FIG. 6E. The processor 120 may display the plurality of camera objects disposed on or overlapping with the preview image.

The plurality of camera objects may be the plurality of camera objects 423 in FIG. 4 or the plurality of camera objects 653 in FIG. 6E.

In operation 703, the processor 120 may detect a user input. The processor 120 may detect a touch input on the execution screen 420 displayed on the second display 240 or an input detected by a physical button. For example, the processor 120 may detect a user input of selecting one of configuration information (e.g. configuration information 411 in FIG. 4), image capturing mode information (e.g. image capturing mode information 415 in FIG. 4), image capturing control information 417, or the plurality of camera objects 423 on the execution screen 420.

In operation 705, the processor 120 may identify (or determine) whether the detected user input is an input for selecting a camera. The input for selecting the camera may correspond to selecting an object (e.g. first object 425, second object 427, and third object 429) included in a plurality of camera objects (e.g. elements indicated by reference numeral 423 in FIG. 4). The input for selecting the camera may correspond to selecting an object (e.g. first object 655, second object 657, third object 659, or fourth object 661) included in a plurality of camera objects (e.g. elements indicated by reference numeral 653 in FIG. 6E). The processor 120 may perform operation 707 if the user input is an input of selecting a camera, and may perform operation 711 if the user input is not an input for selecting a camera.

If the user input is an input for selecting a camera, the processor 120 may activate the selected second camera in operation 707. The second camera in operation 707 may be different from the first camera in operation 701. If first preview image obtained from second camera 215 is displayed in operation 701, the "selected second camera" in operation 707 may be one of the third camera 217, the fourth camera 219, or the fifth camera 225. For example, if the user input is an input for selecting the third camera 217, the processor 120 may activate the third camera 217. The processor 120 may activate the third camera 217 and deactivate the second camera 215.

In operation 709, the processor 120 may display a second preview image obtained from the second camera and a plurality of camera objects. The processor 120 may provide a second execution screen including the second preview image and the plurality of camera objects. The first execution screen in operation 701 may correspond to the execution screen (e.g. first execution screen 810) in FIG. 8A, and the second execution screen in operation 709 may correspond to the execution screen (e.g. second execution screen 820) in FIG. 8B or the execution screen (e.g. third execution screen 830) in FIG. 8C. The third camera 217 and the second camera 215 may have different characteristics. The second preview image is obtained from the third camera 217 and the first preview image is obtained from the second camera 215, and thus the first preview image and the second preview image may be different. For example, the first preview image may be a preview image included in a first execution screen 810 (e.g. first preview image 811 in FIG. 8A), and the second preview image may be a preview image included in a second execution screen 820 (e.g. second preview image 821 in FIG. 8B), or a preview image included in a third execution screen 830 (e.g. third preview image 831 in FIG. 8C).

The plurality of camera objects displayed in operation 701 and the plurality of camera objects displayed in operation 707 may be different from each other. For example, the plurality of camera objects in operation 701 may be a plurality of camera objects (e.g. the first plurality of camera objects 813 in FIG. 8A) included in the first execution screen 810, and the plurality of camera objects in operation 707 may be a plurality of camera objects (e.g. the second plurality of camera objects 823 in FIG. 8B) included in the second execution screen 820, or a plurality of camera objects (e.g. the third plurality of camera objects 833 in FIG. 8C) included in the third execution screen 830.

If the user input is not an input for selecting a camera, the processor 120 may generate and display an image in operation 711. If it is not for selecting a camera, the input may be an input for selecting configuration information, image capturing mode information, image capturing control information, or a physical button. To help in the understanding of the instant disclosure, the following description is of a scenario where the user input detected in operation 703 corresponds to selecting an image capturing button. However, the disclosure is not so limited. If an image capturing button is selected by the user, the processor 120 may generate an image (e.g. photograph) based on the preview image obtained from the second camera 215. The processor 120 may display the generated image on the second display 240. According to an embodiment, the processor 120 may display the generated image for a preconfigured time interval (e.g. three seconds, five seconds), and then return to operation 701. If the processor 120 returns to operation 701, the processor may indicate that there is a generated image in image capturing control information. In the image capturing control information, the generate image may be displayed as a recently captured image. The processor 120 may display the generated image, execute a gallery application if the generated image is selected by the user, and display the generated image as it is stored in the electronic device 101 through the executed gallery application.

Figure 8A:
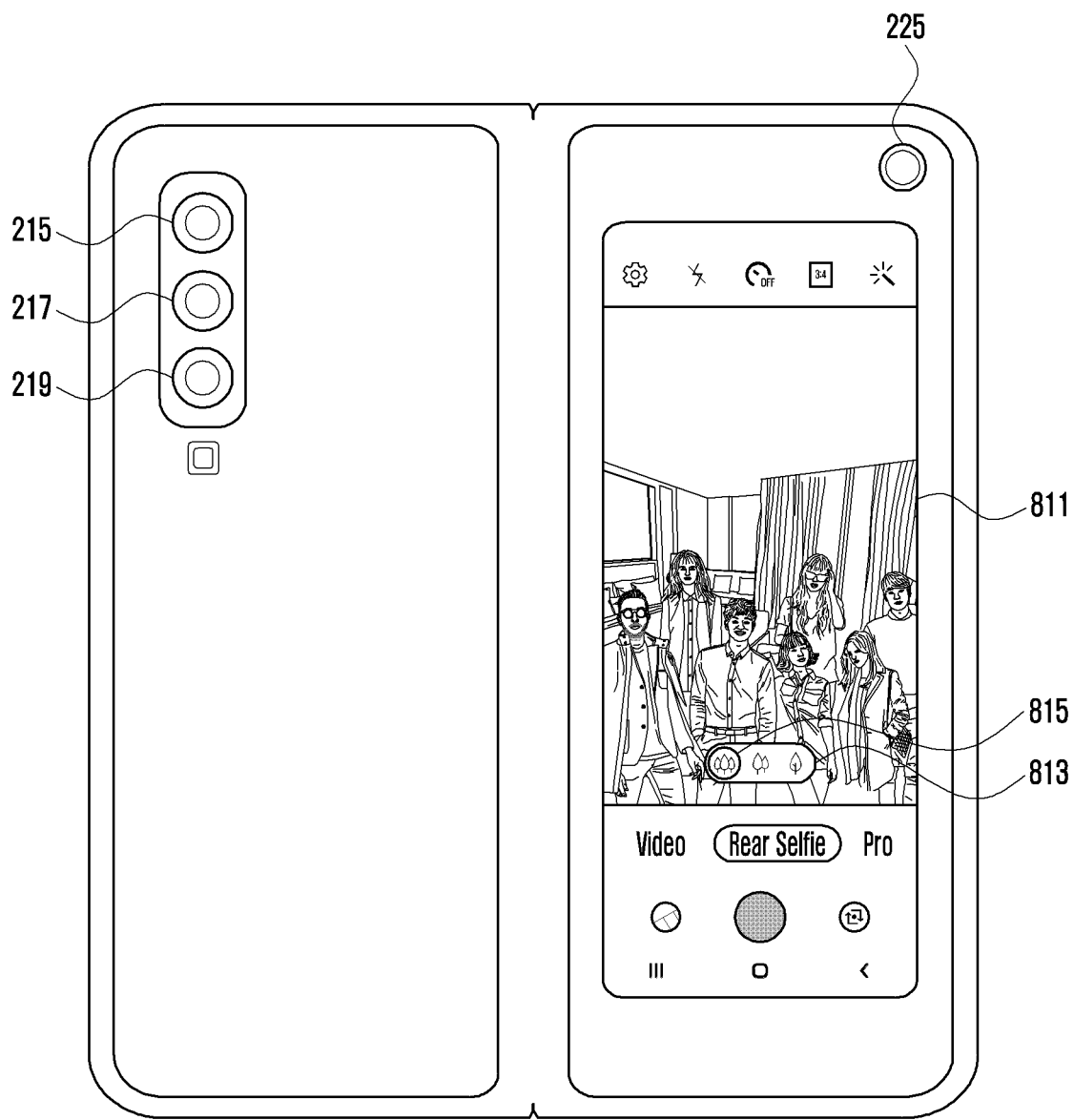
FIGS. 8A-8C are views illustrating an example of preview images obtained by different cameras of an electronic device according to an embodiment.
Figure 8B:
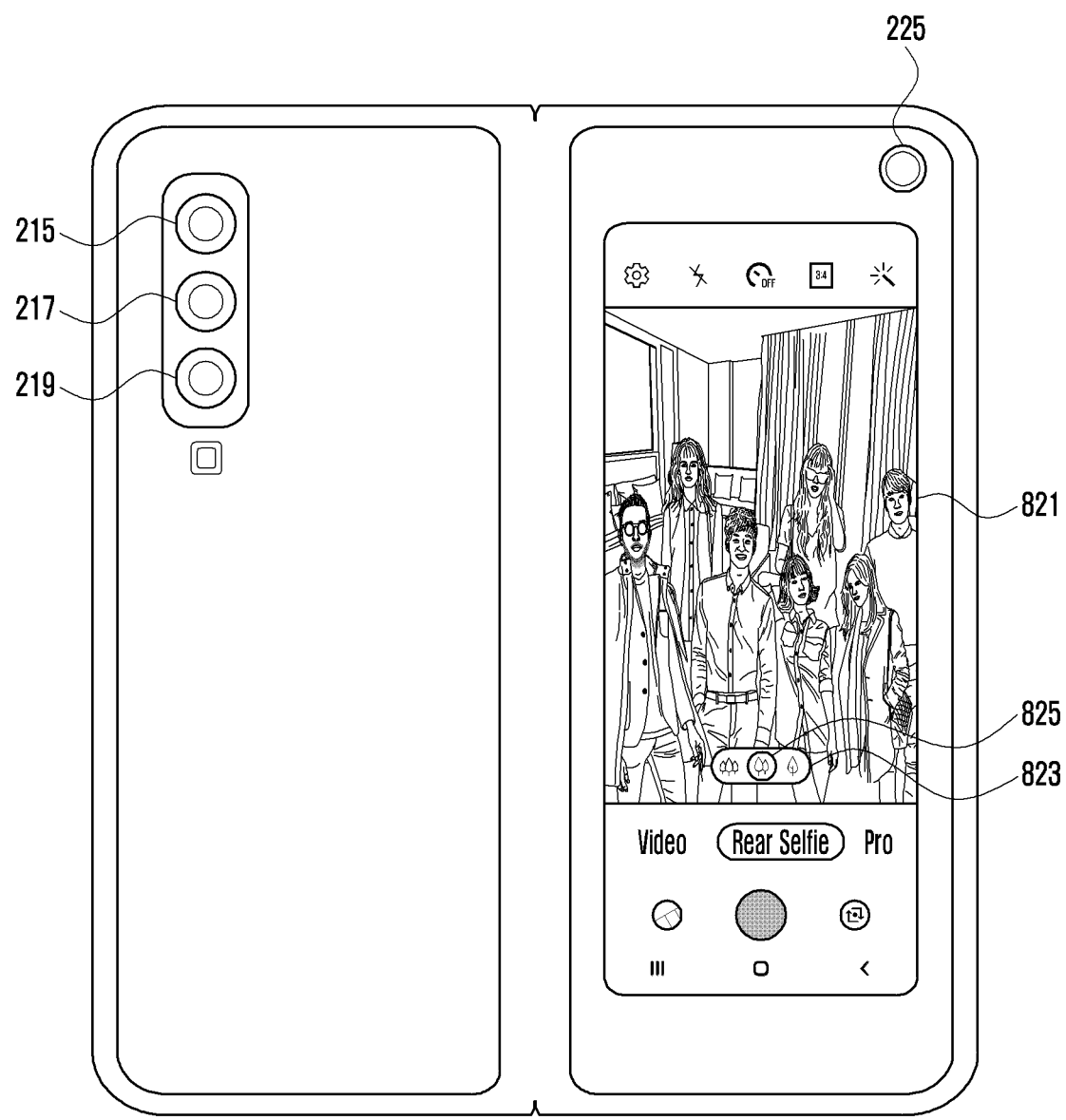
Figure 8C:
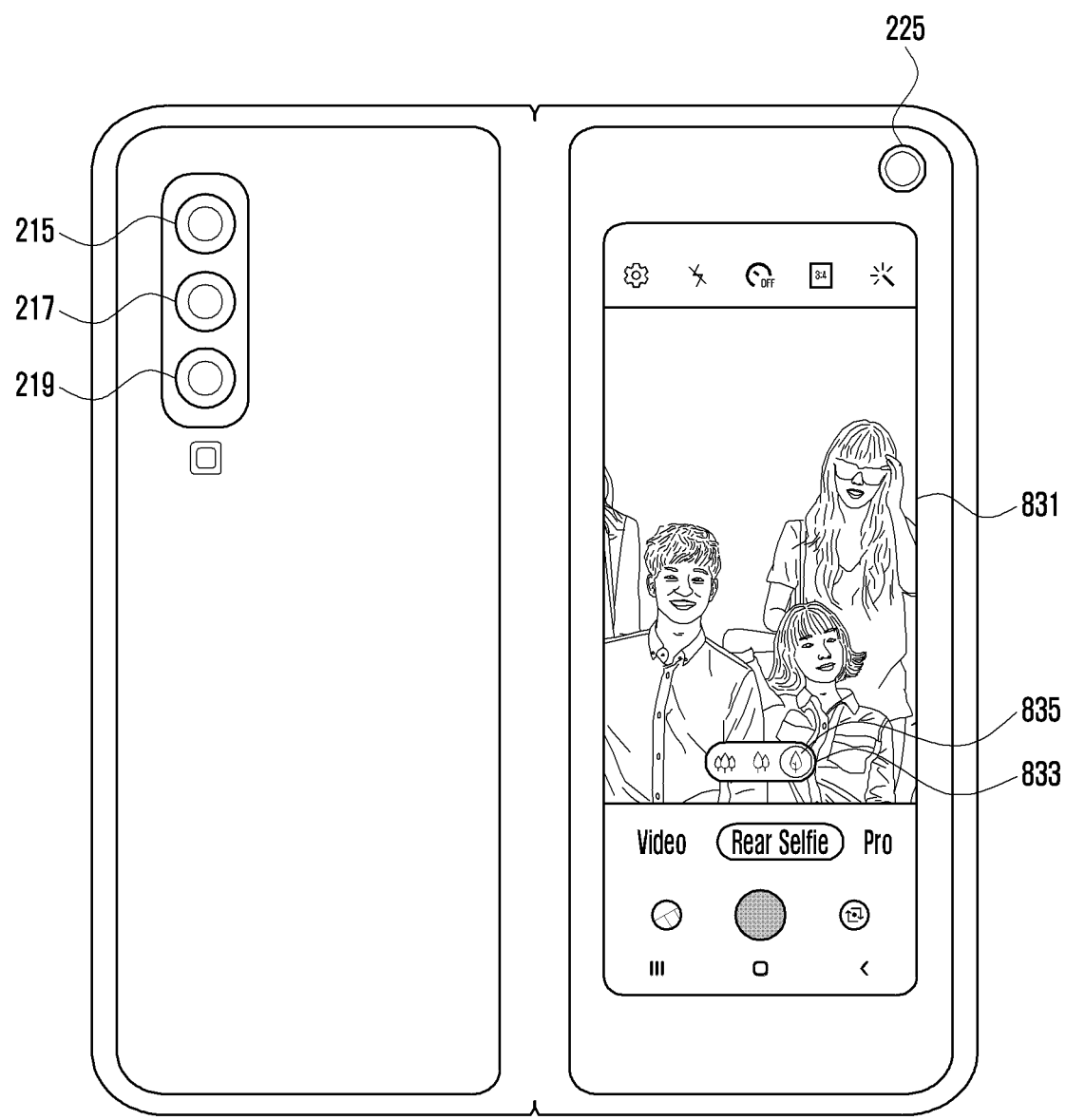

FIGS. 8A to 8C are views illustrating an example of preview images obtained by different cameras of an electronic device according to an embodiment.

FIG. 8A illustrates a first preview image obtained from a first camera of an electronic device.

Referring to FIG. 8A, a processor (e.g. processor 120 in FIG. 1) of an electronic device (e.g. electronic device 101 in FIG. 1) according to an embodiment may display an first execution screen 810 of a camera application on a second display (e.g. second display 240 in FIGS. 2A and 2B) in the open state (e.g. FIG. 2A). The first execution screen 810 may include a first preview image 811 obtained from a second camera (e.g. second camera 215 in FIGS. 2A and 2B) among a plurality of cameras (e.g. first camera 214 to fifth camera 225 in FIGS. 2A and 2B) included (or mounted) in the electronic device 101. The first execution screen 810 may also include a first plurality of camera objects 813. The first plurality of camera objects 813 may include individual objects that correspond to a plurality of cameras (e.g. second camera 215 to fourth camera 219) disposed on a rear surface (e.g. rear surface 250 in FIGS. 2A and 2B) of the electronic device 101. The first plurality of camera objects 813 may display a first object 815, which corresponds to the second camera 215, to be different from the objects corresponding to the third camera 217 and the fourth camera 219. In the first execution screen 810, the second camera 215 has been activated, and thus the first plurality of camera objects 813 may indicate that the first object 815 has been selected.

FIG. 8B illustrates a second preview image obtained from a second camera of an electronic device.

Referring to FIG. 8B, the processor 120 of the electronic device 101 may display a second execution screen 820 of the camera application on the second display (e.g. second display 240 in FIGS. 2A and 2B) in the open state (e.g. FIG. 2A). The second execution screen 820 may include a second preview image 821 obtained from the third camera (e.g. third camera 217 in FIGS. 2A and 2B) among the plurality of cameras (e.g. first camera 214 to fifth camera 225 in FIGS. 2A and 2B) included (or mounted) in the electronic device 101. The second execution screen 820 may also include a second plurality of camera objects 823. The second preview image 821 is obtained from the third camera 217, and may be different from the first preview image 811 obtained from the second camera 215. The angle of view (e.g. larger than 125 degrees) of the second camera 215 may be wider (larger) than the angle of view (e.g. 90 degrees (exclusive) to 125 degrees (inclusive)) of the third camera 217, and thus the second preview image 821 may be different from the first preview image 811.

The second plurality of camera objects 823 may display a second object 825, which corresponds to the third camera 217, to be different from the objects corresponding to the second camera 215 and the fourth camera 219. In the second execution screen 820, the third camera 217 has been activated, and thus the second plurality of camera objects 823 may indicate that the second object 825 has been selected. Since the third camera 217 has been activated in the second plurality of camera objects 823, the second plurality of camera objects may be different from the first plurality of camera objects 813 in which the second camera 215 has been activated.

FIG. 8C illustrates a third preview image obtained from a third camera of an electronic device.

Referring to FIG. 8C, the processor 120 of the electronic device 101 may display a third execution screen 830 of the camera application on the second display (e.g. second display 240 in FIGS. 2A and 2B) in the open state (e.g. FIG. 2A). The third execution screen 830 may include a third preview image 831 obtained from the fourth camera (e.g. fourth camera 219 in FIGS. 2A and 2B) among the plurality of cameras (e.g. first camera 214 to fifth camera 225 in FIGS. 2A and 2B) included (or mounted) in the electronic device 101. The third execution screen 830 may also include a third plurality of camera objects 833. The third preview image 831 is obtained from the fourth camera 219, and may be different from the first preview image 811 obtained from the second camera 215 or the second preview image 821 obtained from the third camera 217. The angle of view (e.g. 90 degrees or smaller) or magnification (e.g. 2x zoom) of the fourth camera 219 may be narrower (smaller) than the angle of view (e.g. larger than 125 degrees) of the second camera 215 or the angle of view (e.g. 90 degrees (exclusive) to 125 degree (inclusive)) of the third camera 217, and thus the third preview image 831 may be different from the first preview image 811 or the second preview image 821.

The third plurality of camera objects 833 may display a third object 835, which corresponds to the fourth camera 219, to be different from the objects corresponding to the second camera 215 and the third camera 217. In the third execution screen 830, the fourth camera 219 has been activated, and thus the third plurality of camera objects 833 may indicate that the third object 835 has been selected. Since the fourth camera 219 has been activated in the third plurality of camera objects 833, the third plurality of camera objects may be different from the first plurality of camera objects 813 in which the second camera 215 has been activated, and the second plurality of camera objects 823 in which the third camera 217 has been activated.

FIGS. 8A to 8C do not illustrate a camera object corresponding to the fifth camera 225, but a camera object relating to the fifth camera 225 may be displayed in the plurality of camera objects as illustrated in FIG. 6E.

Figure 9B:
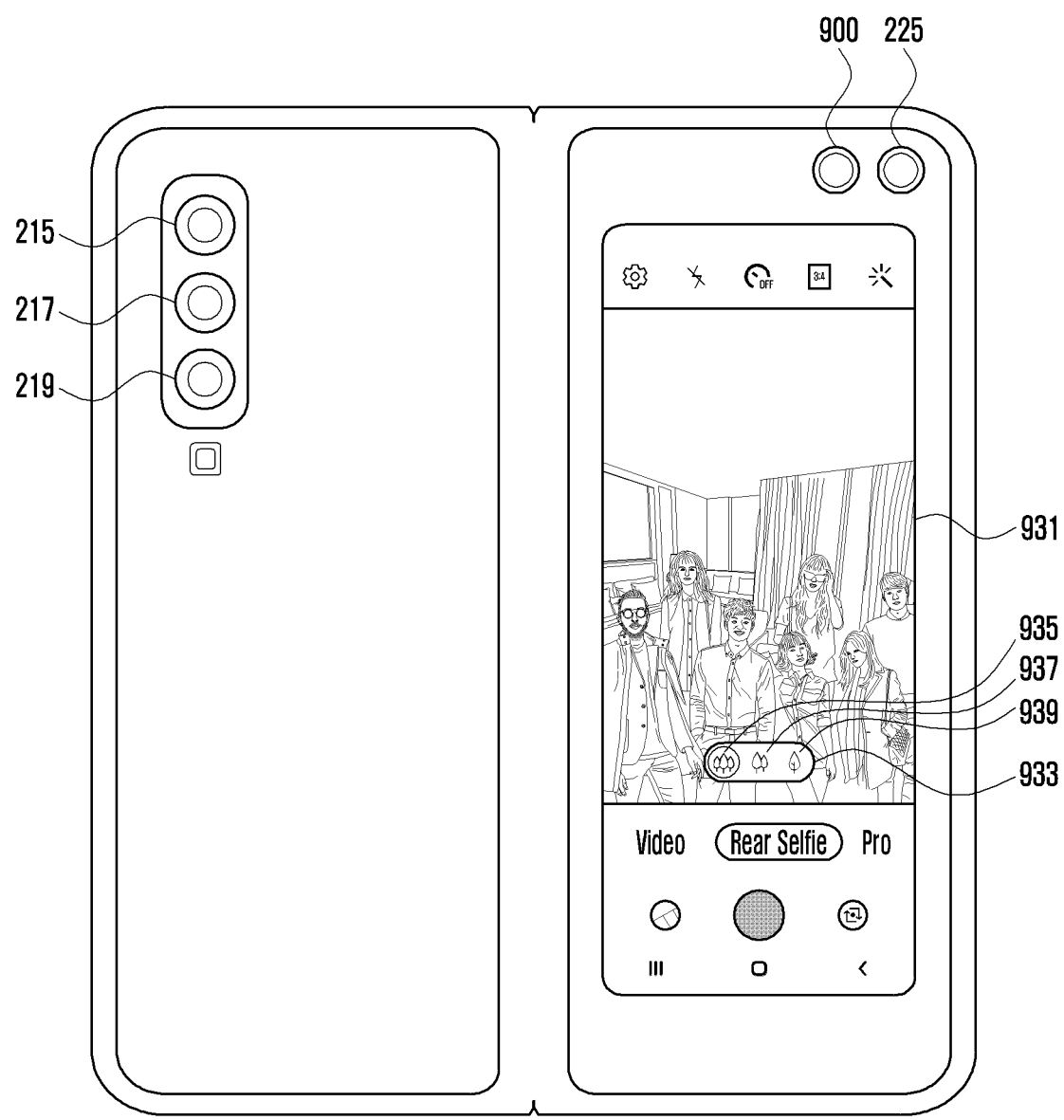
Figure 9C:
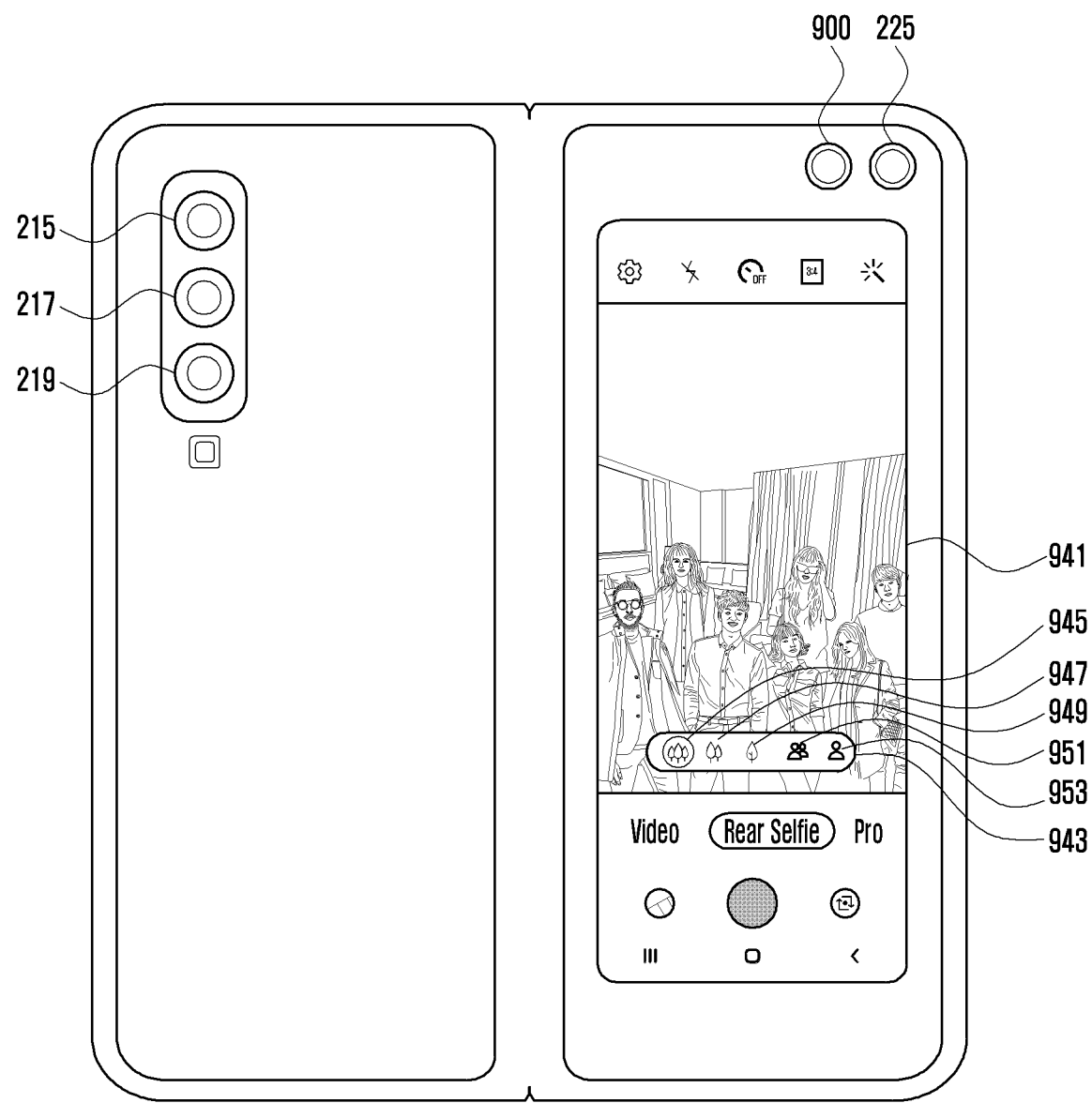

FIGS. 9A-9C are views illustrating an example of a user interface including a plurality of camera objects in an electronic device according to an embodiment.

FIG. 9A illustrates an example of a user interface in a case where a plurality of cameras are included in a third surface of an electronic device.

Referring to FIG. 9A, a processor (e.g. processor 120 in FIG. 1) of an electronic device (e.g. electronic device 101 in FIG. 1) according to an embodiment may display an execution screen 910 of a camera application on a second display (e.g. second display 240 in FIGS. 2A and 2B) in the closed state (e.g. FIG. 2B). The execution screen 910 may include a preview image 911 obtained from one (e.g. fifth camera 225) among a plurality of cameras (e.g. second camera 215 to fifth camera 225 in FIGS. 2A and 2B) included (or mounted) in the electronic device 101. The execution screen 910 may include a plurality of camera objects 913 corresponding to a plurality of cameras (e.g. fifth camera 225 and sixth camera 900) mounted on the third surface 213 included in the first housing 210 of the electronic device 101. The plurality of camera objects 913 may include a first object 915 corresponding to the fifth camera 225 and a second object 917 corresponding to the sixth camera 900. The execution screen 910 may is a preview image 911 obtained from the fifth camera 225, and thus the plurality of camera objects 913 may indicate that the fifth camera 225 has been selected. The plurality of camera objects 913 may display the first object 915 relating to a selected camera (e.g. fifth camera 225) and the second object 917 relating to an unselected camera (e.g. sixth camera 900) such that the objects are different from each other. The fifth camera 225 and sixth camera 900 may have different camera characteristics.

According to an embodiment, the processor 120 of the electronic device 101 may provide an image capturing guide message 921 if the device is changed to the open state (e.g. FIG. 2A). If the state of the electronic device 101 is changed from the closed state to the open state, the processor 120 may display an execution screen 920 including the image capturing guide message 921 on the second display 240. The execution screen 920 may display the image capturing guide message 921 on the execution screen 910 in FIG. 9A. The image capturing guide message 921 may include at least one of text, image, or video. The image capturing guide message 921 may include a camera position notification image 923 and notification text 925. The camera position notification image 923 may notify a user that image capturing is possible in the Rear Selfie mode through a camera (e.g. second camera 215 to fourth camera 219 in FIGS. 2A and 2B) disposed on the rear surface (e.g. fourth surface 223) of the electronic device 101. The notification text 925 may guide the user to open the electronic device 101 so that the user faces the rear surface of the electronic device 101.

FIG. 9B illustrates an example of a user interface of an electronic device in the open state.

Referring to FIG. 9B, the processor 120 of the electronic device 101 may provide an execution screen 930 for capturing an image in the Rear Selfie mode in the open state (e.g. FIG. 2A). The execution screen 930 may include a preview image 931 obtained from at least one camera (e.g. second camera 215) among the second camera 215, the third camera 217, or the fourth camera 219 disposed on the rear surface 250 of the electronic device 101. The processor 120 may display the image capturing guide message 921 in FIG. 9A, then activate (drive) the second camera 215, and deactivate (turn off) the fifth camera 225. The execution screen 930 may include a plurality of camera objects 933. The plurality of camera objects 933 may be displayed on the preview image 931 while overlapping with the preview image. The plurality of camera objects 933 may be objects (or images, icons) that allow the user to select the second camera 215, the third camera 217, or the fourth camera 219. For example, the plurality of camera objects 933 may include a first object 935 corresponding to the second camera 215, a second object 937 corresponding to the third camera 217, or a third object 939 corresponding to the fourth camera 219.

FIG. 9C illustrates another example of a user interface of an electronic device in the open state.

Referring to FIG. 9C, the processor 120 of the electronic device 101 may provide an execution screen 940 for capturing an image in the Rear Selfie mode in the open state (e.g. FIG. 2A). The execution screen 940 may include a preview image 941 obtained from at least one camera (e.g. second camera 215) among the second camera 215, the third camera 217, the fourth camera 219, the fifth camera 225, or the sixth camera 900 disposed on the rear surface 250 of the electronic device 101. The execution screen 940 may also include a plurality of camera objects 943. The plurality of camera objects 943 may be objects (or images, icons) that allow the user to select the second camera 215, the third camera 217, the fourth camera 219, the fifth camera 225, or the sixth camera 900. For example, the plurality of camera objects 933 may include a first object 945 corresponding to the second camera 215, a second object 947 corresponding to the third camera 217, a third object 949 corresponding to the fourth camera 219, a fourth object 951 corresponding to the fifth camera 225, or a fifth object 953 corresponding to the sixth camera 900. According to an embodiment, the processor 120 may maintain the activation of the fifth camera 225 in the execution screen 940. Alternatively, the processor 120 may deactivate the fifth camera 225 in the execution screen 940, and activate (or drive) the second camera 215.

Figure 10:
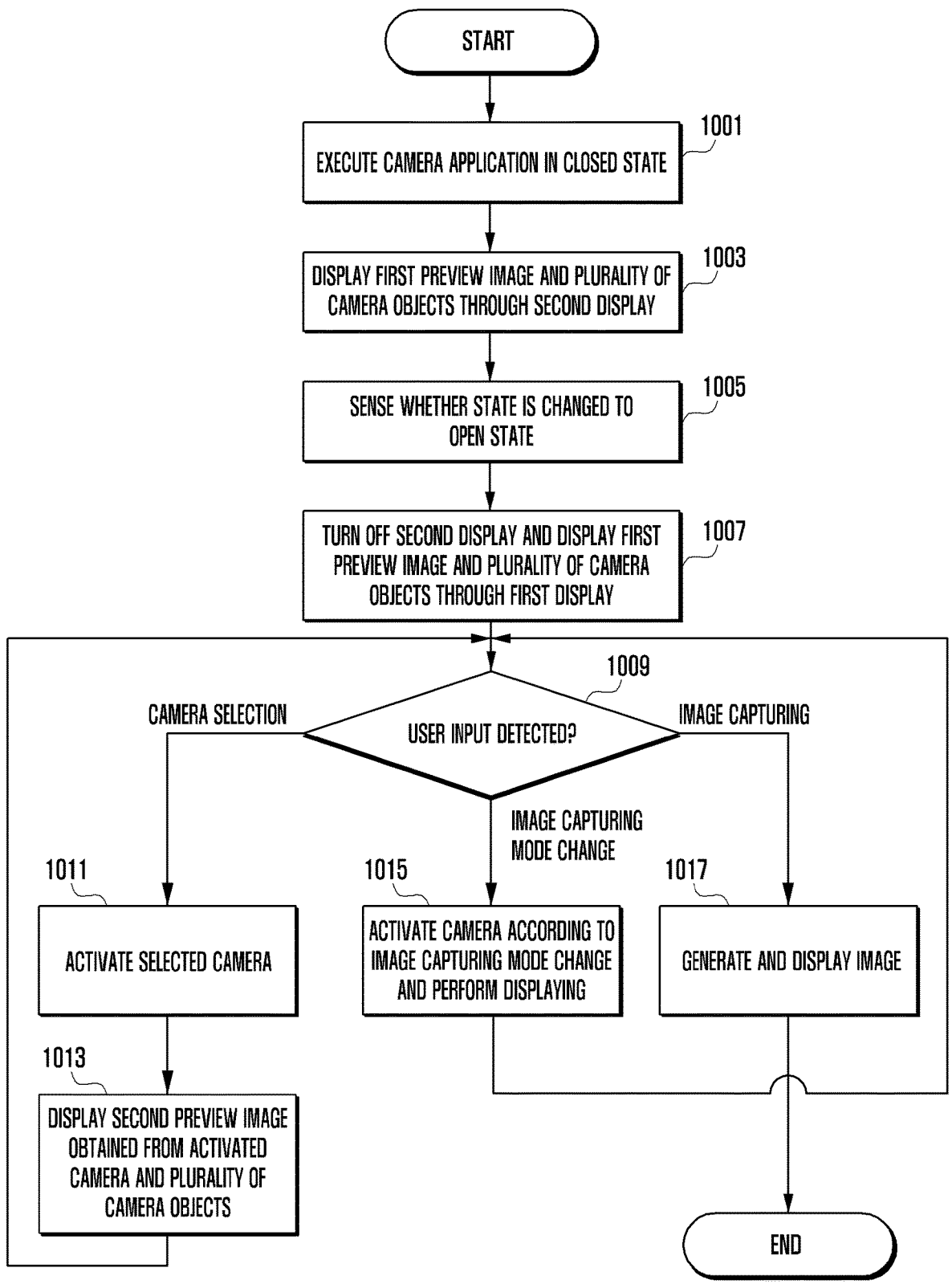
FIG. 10 is a flowchart illustrating a method for controlling image capturing, based on a state of an electronic device according to an embodiment.

FIG. 10 is a flowchart illustrating a method for controlling image capturing, based on a state of an electronic device according to an embodiment.

Referring to FIG. 10, in operation 1001, a processor (e.g. processor 120 in FIG. 2) of an electronic device (e.g. electronic device 101 in FIG. 1) according to an embodiment may execute a camera application in the closed state (e.g. FIG. 2B). At the time of executing of the camera application, the processor 120 may activate the camera which was last previously used by a user. Such camera may be among a plurality of cameras (e.g. second camera 215, third camera 217, fourth camera 219, or fifth camera 225) included (or mounted) in the electronic device 101. In FIG. 10, it is presupposed that the activated camera is one among the plurality of cameras (e.g. second camera 215, third camera 217, and fourth camera 219) mounted on a fourth surface (e.g. fourth surface 223 in FIGS. 2A and 2B) of electronic device 101. For example, the processor 120 may activate a second camera 215.

In operation 1003, the processor 120 may display a first preview image and a plurality of camera objects through a second display. For example, the processor 120 may display an execution screen including a first preview image obtained from the second camera 215 and a plurality of camera objects through a second display (e.g. second display 240 in FIGS. 2A and 2B). The execution screen displayed in the operation 1003 may be a first execution screen 1110 in FIG. 11A. The plurality of camera objects may include individual objects corresponding to the second camera 215, the third camera 217, and the fourth camera 219, respectively.

In operation 1005, the processor 120 may sense whether the electronic device 101 is changed to the open state. The processor 120 may sense movement of the electronic device 101 based on data from at least one sensor (e.g. sensor module 176 in FIG. 1), and identify that a change from the closed state to the open state has occurred. The open state (e.g. state of electronic device 101 in FIG. 2A) may mean that the angle between the first housing 210 and the second housing 220 is 180 degrees, and in the open state, the first surface 211 of the first housing 210 and the second surface 221 of the second housing 220 may be arranged to be oriented in the same direction.

In operation 1007, the processor 120 may turn off the second display 240, and display a first preview image and the plurality of camera objects through a first display. While the processor 120 is displaying, on the second display 240, a preview image obtained from a camera included in the fourth surface 223 of the electronic device 101 in the closed state, if the electronic device 101 is changed from the closed state to the open state, the processor 120 may turn off (or deactivate) the second display 240 and turn on (or activate, drive) the first display (e.g. first display 230 in FIGS. 2A and 2B). The processor 120 may display the execution screen including the first preview image obtained from the second camera 215 and the plurality of camera objects through the first display 230. The execution screen displayed in the operation 1007 may be the second execution screen 1120 in FIG. 11B. The plurality of camera objects may include individual objects corresponding to the second camera 215, the third camera 217, and the fourth camera 219, respectively. The preview image displayed in operation 1007 may be identical to the preview image displayed in operation 1003, except that the image has been scaled to fit the first display 230.

In operation 1009, the processor 120 may identify (or sense) whether a user input is detected. The processor 120 may detect a touch input on the execution screen (e.g. second execution screen 1120 in FIG. 11B) displayed on the first display 230 or an input detected using a physical button. For example, the processor 120 may detect a user input of selecting one of configuration information (e.g. configuration information 411 in FIG. 4), image capturing mode information (e.g. image capturing mode information 415 in FIG. 4), image capturing control information (e.g. image capturing control information 417 in FIG. 4), or a plurality of camera objects (e.g. plurality of camera objects 1123 in FIG. 11B) on a second execution screen 1120. The processor 120 may perform operation 1011 if the user input corresponds to a camera selection, may perform operation 1015 if the user input corresponds to an image capturing mode change, and may perform operation 1017 if the user input corresponds to an image capturing button.

If the user input corresponds to a camera selection, the processor 120 may activate a selected camera in operation 1011. The camera selection may correspond to a user input of selecting an object corresponding to a camera among the plurality of camera objects displayed in operation 1007. According to an embodiment, the processor 120 may activate a selected camera among a plurality of cameras disposed on the rear surface 250 of the electronic device 101. The plurality of cameras disposed on the rear surface 250 of the electronic device 101 may include at least one of the second camera 215, the third camera 217, the fourth camera 219, or the fifth camera 225. For example, if the second camera 215 is activated in operation 1007, the processor 120 may activate one selected from the third camera 217 or the fourth camera 219. For example, if the second camera 215 is activated in operation 1007, the processor 120 may activate one selected from the third camera 217, the fourth camera 219, or the fifth camera 225. To help understanding of the disclosure, the following description is based on the third camera 217 being selected in operation 1011. However, the disclosure is not so limited.

In operation 1013, the processor 120 may display a second preview image obtained from the activated camera and a plurality of camera objects. For example, the processor 120 may display an execution screen including a second preview image obtained from the third camera 217 and a plurality of camera objects on the first display 230. The execution screen in operation 1013 may be different from the execution screen in operation 1007. In operation 1013, the preview image is a second preview image obtained from the third camera 217, and in operation 1007, the preview image is a first preview image obtained from the second camera 215. The first preview image and the second preview image may be different. In operation 1013, the third camera 217 has been activated, and in operation 1007, the second camera 215 has been activated, and thus selected objects in the plurality of camera objects in operation 1013 and the plurality of camera objects in operation 1007 may be differently displayed.

If the user input corresponds to an image capturing mode change, the processor 120 may activate a camera according to the image capturing mode change and display a preview image obtained from the activated camera, in operation 1015. For example, the image capturing mode configured in operation 1007 and the image capturing mode configured in operation 1015 may be different. For example, the image capturing mode may be Normal in operation 1007, and the image capturing mode may be Selfie in operation 1015. The processor 120 may perform operation 1015 and then return to operation 1009.

If the user input corresponds to an image capturing button, the processor 120 may generate and display an image in operation 1017. If an image capturing button is selected by the user, the processor 120 may generate an image (e.g. photograph) based on the preview image obtained from the second camera 215. The processor 120 may display the generated image on the first display 230. According to an embodiment, the processor 120 may display the generated image for a preconfigured time interval (e.g. three seconds, five seconds), and then return to operation 1007. If the processor 120 returns to operation 1007, the processor may indicate that there is a generated image in image capturing control information. Operation 1017 is identical or similar to operation 711 in FIG. 7, and thus the detailed description of operation 1017 will be omitted.

Figure 11A:
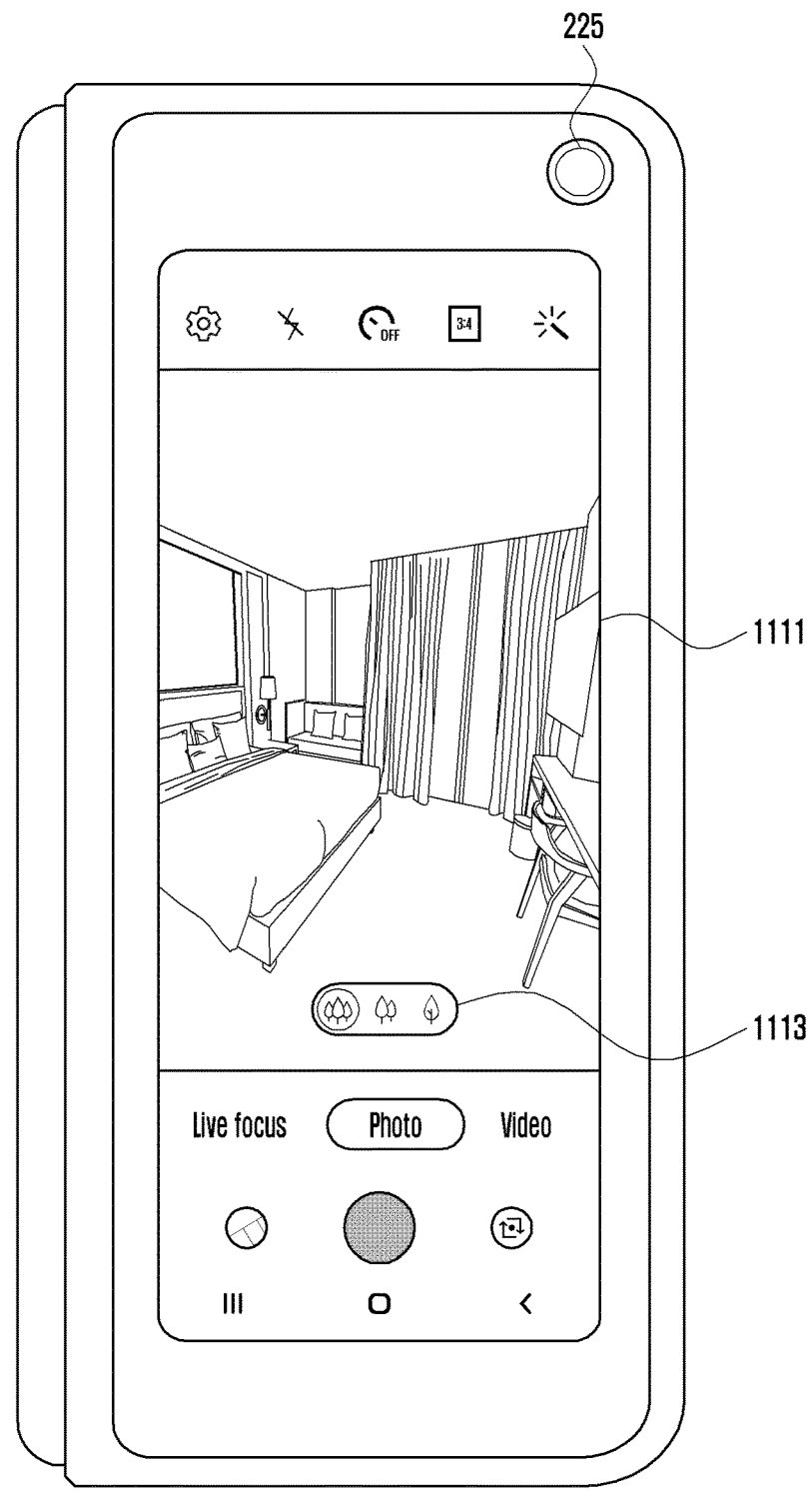
FIGS. 11A-11C are views illustrating an example of displaying different preview images according to an activated camera in an electronic device according to an embodiment.
Figure 11B:
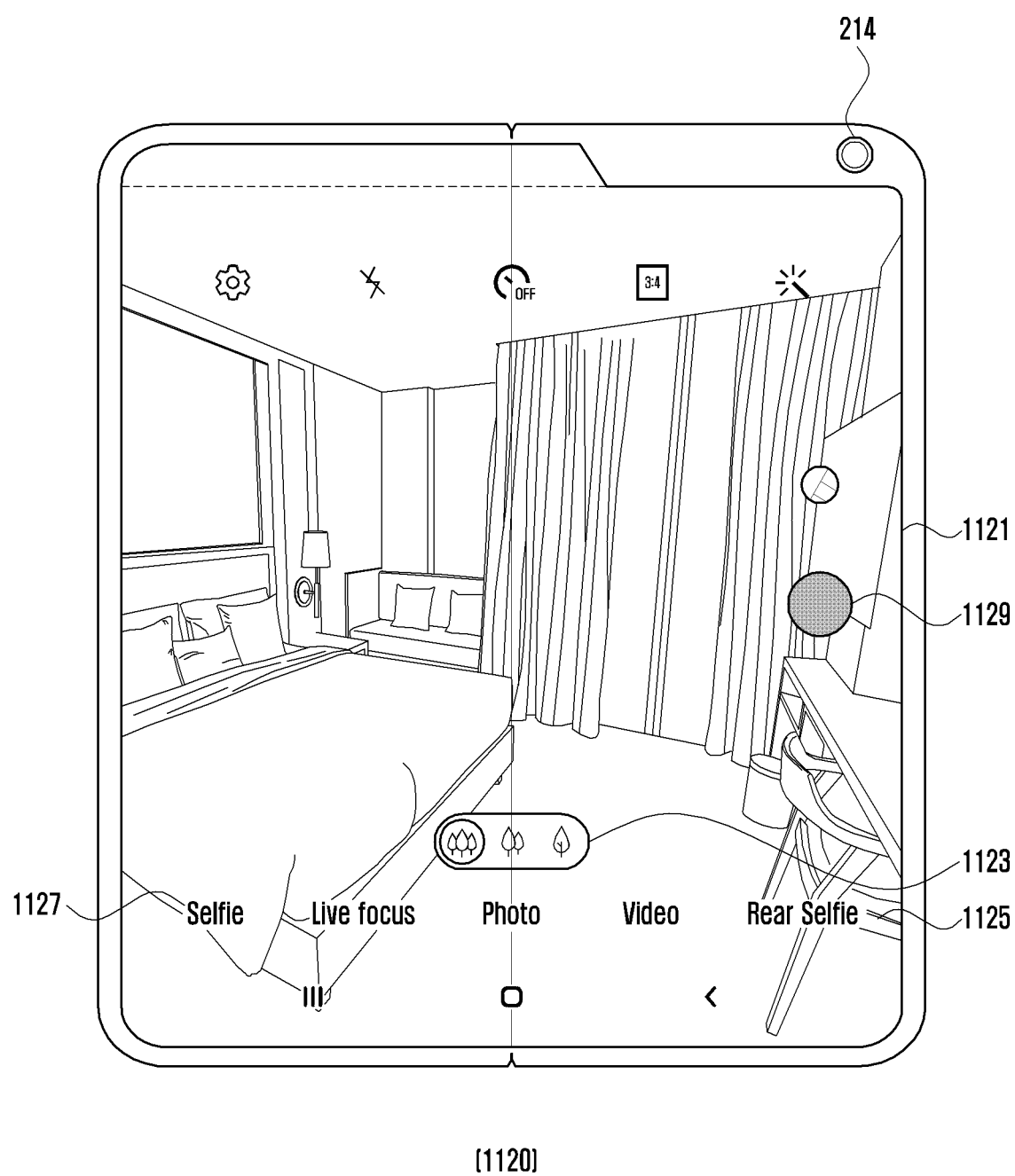
Figure 11C:
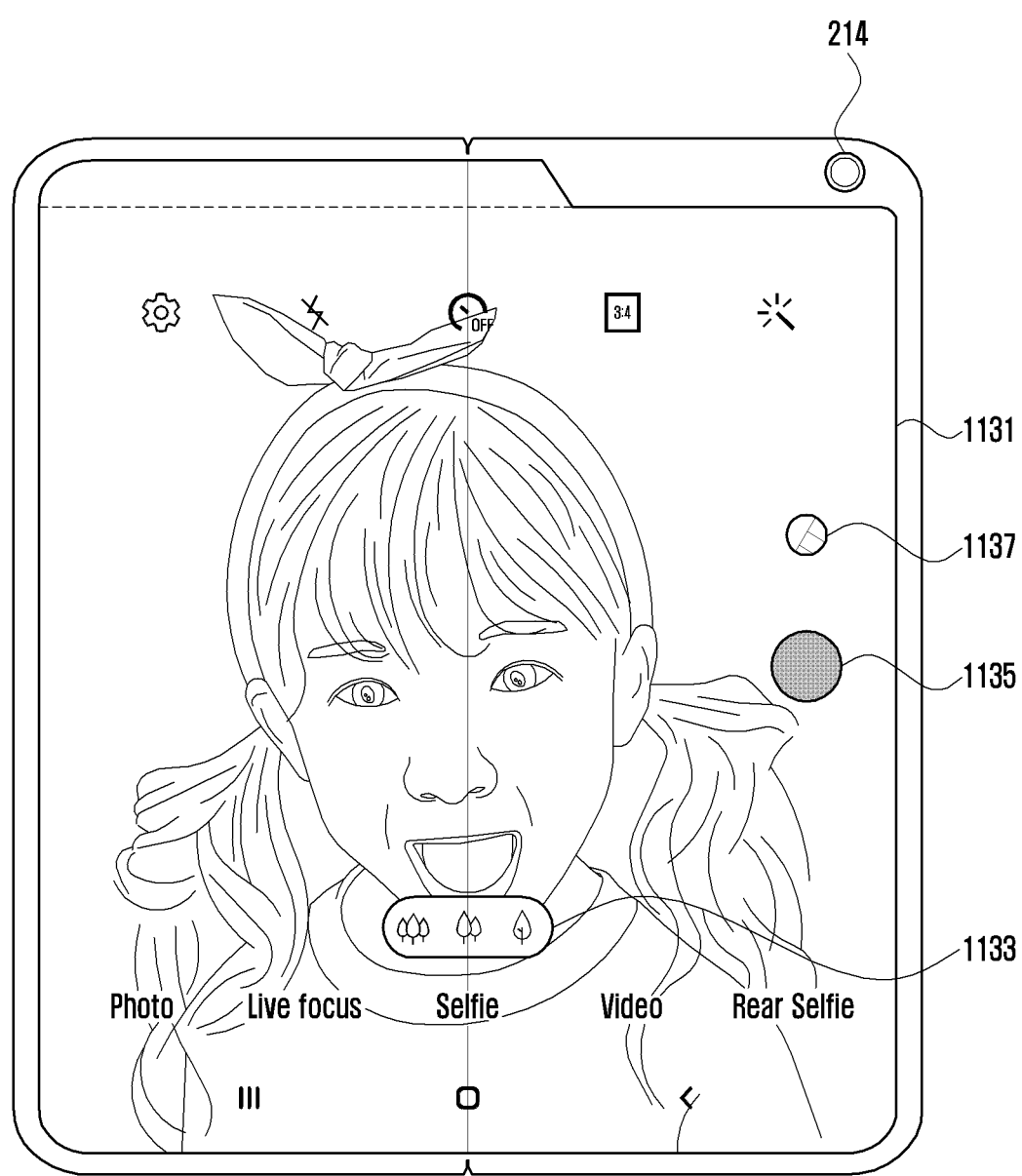

FIGS. 11A-11C are views illustrating an example of displaying different preview images according to an activated camera in an electronic device according to an embodiment.

FIG. 11A illustrates an example of displaying a preview image by an electronic device in the closed state.

Referring to FIG. 11A, a processor (e.g. processor 120 in FIG. 1) of an electronic device (e.g. electronic device 101 in FIG. 1) according to an embodiment may display an first execution screen 810 of a camera application on a second display (e.g. second display 240 in FIGS. 2A and 2B) in the closed state (e.g. FIG. 2B). The first execution screen 1110 may include a first preview image 1111 obtained from the second camera (e.g. second camera 215 in FIGS. 2A and 2B) among a plurality of cameras (e.g. second camera 215 to fifth camera 225 in FIGS. 2A and 2B) included (or mounted) in the electronic device 101. The first execution screen 1110 may also include a first plurality of camera objects 1113. The first plurality of camera objects 1113 may include individual objects corresponding to the plurality of cameras (e.g. second camera 215 to fourth camera 219) disposed on the rear surface (e.g. rear surface 250 in FIGS. 2A and 2B) of the electronic device 101. The first plurality of camera objects 1113 may display a first object relating to the second camera 215 to be different from objects relating to the third camera 217 and the fourth camera 219. In the first execution screen 1110, the second camera 215 has been activated, and thus the first plurality of camera objects 1113 may indicate that the first object 815 has been selected.

FIG. 11B illustrates an example of displaying a preview image by an electronic device in an open state.

Referring to FIG. 11B, a processor (e.g. processor 120 in FIG. 1) of an electronic device (e.g. electronic device 101 in FIG. 1) according to an embodiment may display a second execution screen 1120 of a camera application on a first display (e.g. first display 230 in FIGS. 2A and 2B) in the open state (e.g. FIG. 2A). The second execution screen 1120 may include a second preview image 1121 obtained from a second camera (e.g. second camera 215 in FIGS. 2A and 2B) among the plurality of cameras (e.g. first camera 214 to fifth camera 225 in FIGS. 2A and 2B) included (or mounted) in the electronic device 101. The second execution screen 1120 may also include a second plurality of camera objects 1123. Each of the first execution screen 1110 and the second execution screen 1120 may include a preview image obtained from the same second camera 215 and a plurality of camera objects, and thus the screens may be the same. That is, the first execution screen 1110 and the second execution screen 1120 may be identical except for being scaled differently to be displayed on different displays. The first execution screen 1110 may be displayed on the second display 240, and the second execution screen 1120 may be displayed on the first display 230. The second execution screen 1120 may further include configuration information (e.g. configuration information 411 in FIG. 4), image capturing mode information 1125, and an image capturing button 1129. The processor 120 may detect (or receive) a user input of selecting an image capturing mode to be Selfie 1127 on the second execution screen 1120.

FIG. 11C illustrates another example of displaying a preview image by an electronic device in the open state.

Referring to FIG. 11C, a processor (e.g. processor 120 in FIG. 1) of an electronic device (e.g. electronic device 101 in FIG. 1) according to an embodiment may display a third execution screen 1130 of a camera application on a first display (e.g. first display 230 in FIGS. 2A and 2B) in the open state (e.g. FIG. 2A). The third execution screen 1130 may include a third preview image 1131 obtained from a first camera 214 among a plurality of cameras (e.g. first camera 214 to fifth camera 225 in FIGS. 2A and 2B) included (or mounted) in the electronic device 101. The third execution screen 1130 may also include a third plurality of camera objects 1133. The processor 120 may detect a user input of changing an image capturing mode to be "Selfie 1127" while displaying the second execution screen 1120. The processor 120 may display the third execution screen 1130, based on the detected user input. The processor 120 may deactivate the second camera 215, based on the detected user input, and activate the first camera 214. The third execution screen 1130 may further include configuration information (e.g. configuration information 411 in FIG. 4), image capturing mode information 1125, an image capturing button 1135, and/or a previously captured image view 1137.

Figure 12:
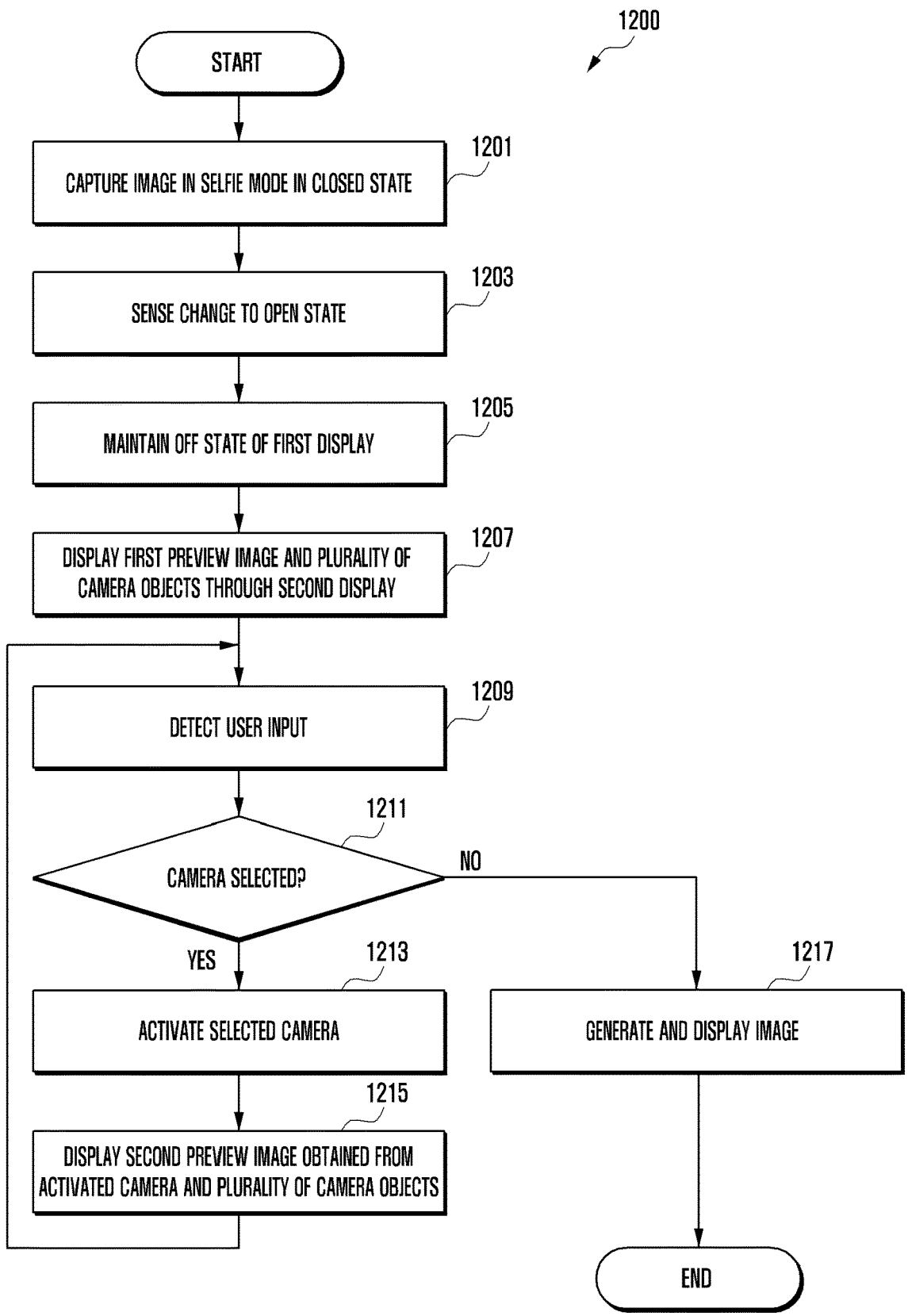
FIG. 12 is a flowchart illustrating a method for controlling image capturing, based on a state of an electronic device according to an embodiment.

FIG. 12 is a flowchart illustrating a method for controlling image capturing, based on a state of an electronic device according to an embodiment.

Referring to FIG. 12, in operation 1201, a processor (e.g. processor 120 in FIG. 2) of an electronic device (e.g. electronic device 101 in FIG. 1) according to an embodiment may capture an image in the Selfie mode in the closed state (e.g. FIG. 2B). The processor 120 may capture an image in the Selfie mode by activating the fifth camera 225 among a plurality of cameras (e.g. second camera 215 to fifth camera 225 in FIGS. 2A and 2B) included (or mounted) in the electronic device 101, when the electronic device 101 is in the closed state. The processor 120 may display the preview image obtained from the fifth camera 225 on a second display (e.g. second display 240 in FIGS. 2A and 2B). The processor 120 may display a plurality of camera objects while capturing the image in the Selfie mode in the closed state.

In operation 1203, the processor 120 may sense a change to the open state. The processor 120 may sense (or detect) whether the electronic device 101 is changed to the open state by the user. The open state (e.g. state of electronic device 101 in FIG. 2A) may mean that the angle between the first housing 210 and the second housing 220 is 180 degrees, and in the open state, the first surface 211 of the first housing 210 and the second surface 221 of the second housing 220 may be arranged to be oriented in the same direction. The processor 120 may also sense an intermediate state, and such a state may suffice as the open state.

In operation 1205, the processor 120 may maintain the OFF state of a first display. In the closed state as in operation 1201, the first display (e.g. first display 230 in FIGS. 2A and 2B) may be turned off. In the closed state, the user does not see the first display 230, and information relating to the electronic device 101 may be displayed through a second display 240. While the processor 120 is capturing an image in the Selfie mode in the closed state, if the electronic device 101 is changed to the open state, the processor may maintain the OFF state of the first display 230.

In operation 1207, the processor 120 may display a first preview image and a plurality of camera objects through the second display 240. The processor 120 may activate a second camera 215 among a plurality of cameras (e.g. first camera 214 to fifth camera 225 in FIGS. 2A and 2B) included (or mounted) in the electronic device 101. The processor 120 may display an execution screen including a first preview image obtained from the second camera 215 and a plurality of camera objects on the second display 240. The processor 120 may deactivate (or turn off) the fifth camera 225, and activate the second camera 215, instead. In operation 1207, the second camera 215 is activated, and in operation 1201, the fifth camera 225 is activated, and thus the execution screen (e.g. execution screen 420 in FIG. 4) in operation 1207 may be different from the execution screen (e.g. execution screen 410 in FIG. 4) in operation 1201. The first preview image may be the preview image 421 in FIG. 4 or the preview image 652 in FIG. 6E. The processor 120 may display the plurality of camera objects disposed on (overlapping with) the preview image. The plurality of camera objects may be the plurality of camera objects 423 in FIG. 4 or the plurality of camera objects 653 in FIG. 6.

According to an embodiment, in FIG. 12, operation 1207 is performed after operation 1205, but operation 1205 and operation 1207 may be performed at the same time, or operation 1205 may be performed after operation 1207.

According to an embodiment, the processor 120 may display an image capturing guide message during operation 1203 to operation 1207. According to an embodiment, if the electronic device 101 is changed into the open state during operation 1201, the processor 120 may perform operation 1207 even without a user input.

In operation 1209, the processor 120 may detect a user input. The processor 120 may detect a touch input on an execution screen (e.g. execution screen 420 in FIG. 4) displayed on the second display 240 or an input detected by a physical button. For example, the processor 120 may detect a user input of selecting one of configuration information (e.g. configuration information 411 in FIG. 4), image capturing mode information (e.g. image capturing mode information 415 in FIG. 4), image capturing control information (e.g. image capturing control information 417), or the plurality of camera objects 423 on the execution screen 420. Operation 1209 is identical or similar to operation 703 in FIG. 7, and thus the detailed description of operation 1209 will be omitted.

In operation 1211, the processor 120 may identify (or determine) whether the detected user input is an input of selecting a camera. The input of selecting the camera may correspond to selecting an object (e.g. first object 425, second object 427, and third object 429) included in the plurality of camera objects (e.g. plurality of objects 423 in FIG. 4). The input of selecting the camera may correspond to selecting an object (e.g. first object 655, second object 657, third object 659, or fourth object 661) included in the plurality of camera objects 653. The processor 120 may perform operation 1213 if the user input is an input of selecting a camera, and may perform operation 1217 if the user input is not an input of selecting a camera.

If the user input is an input of selecting a camera, the processor 120 may activate the selected camera (e.g. third camera 217) in operation 1213. If a first preview image obtained from the second camera 215 is displayed in operation 1207, the selected camera in operation 1211 may be one of the third camera 217, the fourth camera 219, or the fifth camera 225. For example, if the user input is an input of selecting the third camera 217, the processor 120 may activate the third camera 217. The processor 120 may activate the third camera 217 and deactivate the second camera 215.

In operation 1215, the processor 120 may display a second preview image obtained from the activated camera and a plurality of camera objects. The processor 120 may provide a second execution screen including the second preview image and the plurality of camera objects. The first execution screen in operation 1207 may correspond to the execution screen (e.g. first execution screen 810) in FIG. 8A, and the second execution screen in operation 1215 may correspond to the execution screen (e.g. second execution screen 820) in FIG. 8B or the execution screen (e.g. third execution screen 830) in FIG. 8C based on the selected camera. The third camera 217 and the second camera 215 may have different optical characteristics. In one example, the second preview image is obtained from the third camera 217 and the first preview image is obtained from the second camera 215, and thus the first preview image and the second preview image may be different. Operation 1215 is identical or similar to operation 709, and thus the detailed description of operation 1215 will be omitted.

If the user input is not an input for selecting a camera, the processor 120 may generate and display an image in operation 1217. Such an input may be an input of selecting configuration information, image capturing mode information, image capturing control information, or a physical button. If an image capturing button is selected by the user, the processor 120 may generate an image (e.g. photograph) based on the preview image obtained from the second camera 215. The processor 120 may display the generated image on the second display 240. Operation 1217 is identical or similar to operation 711, and thus the detailed description of operation 1217 will be omitted.

Figure 13A:
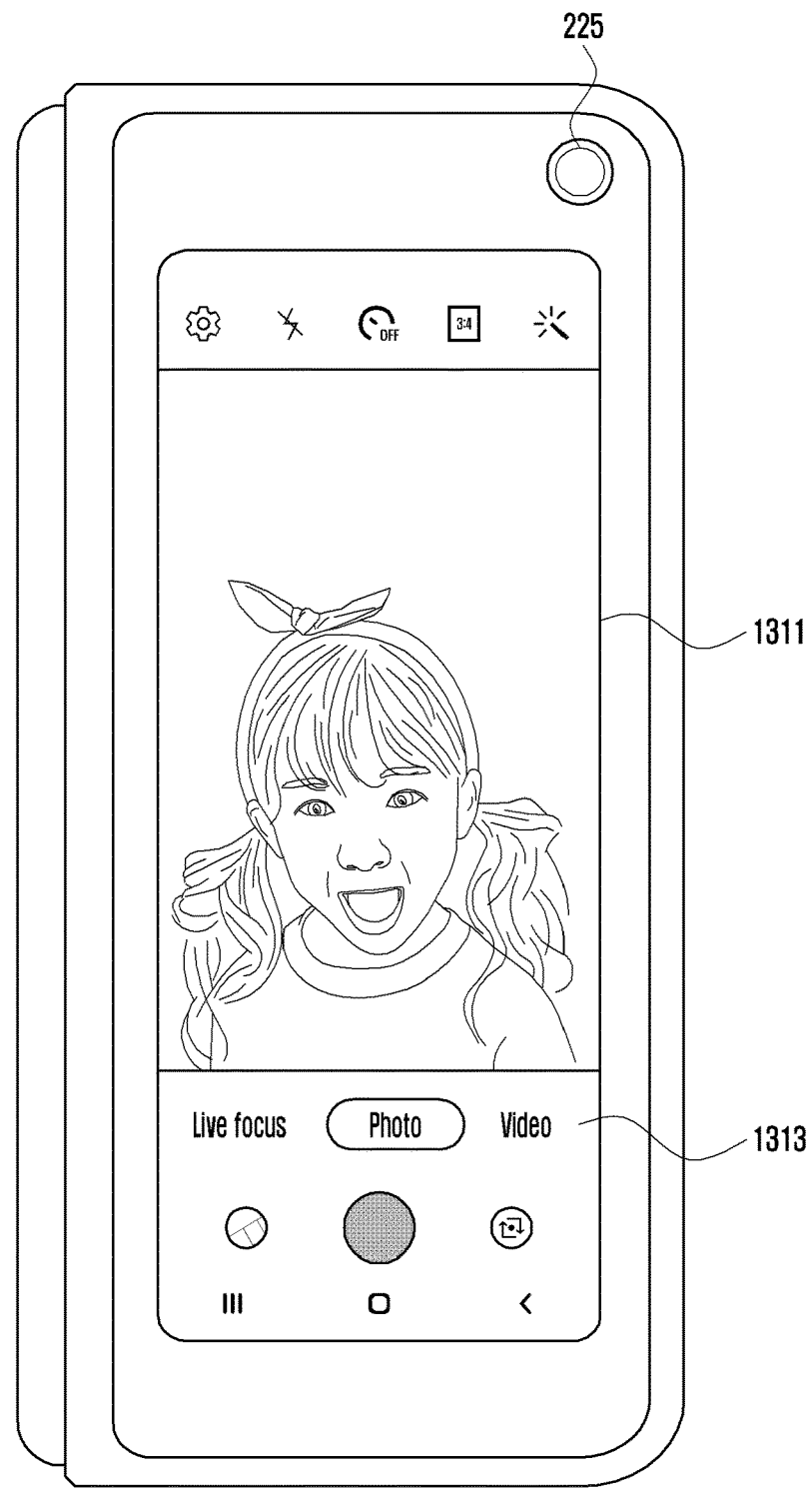
FIGS. 13A-13B are views illustrating an example of controlling a display according to a camera performing image capturing in an electronic device according to an embodiment.
Figure 13B:
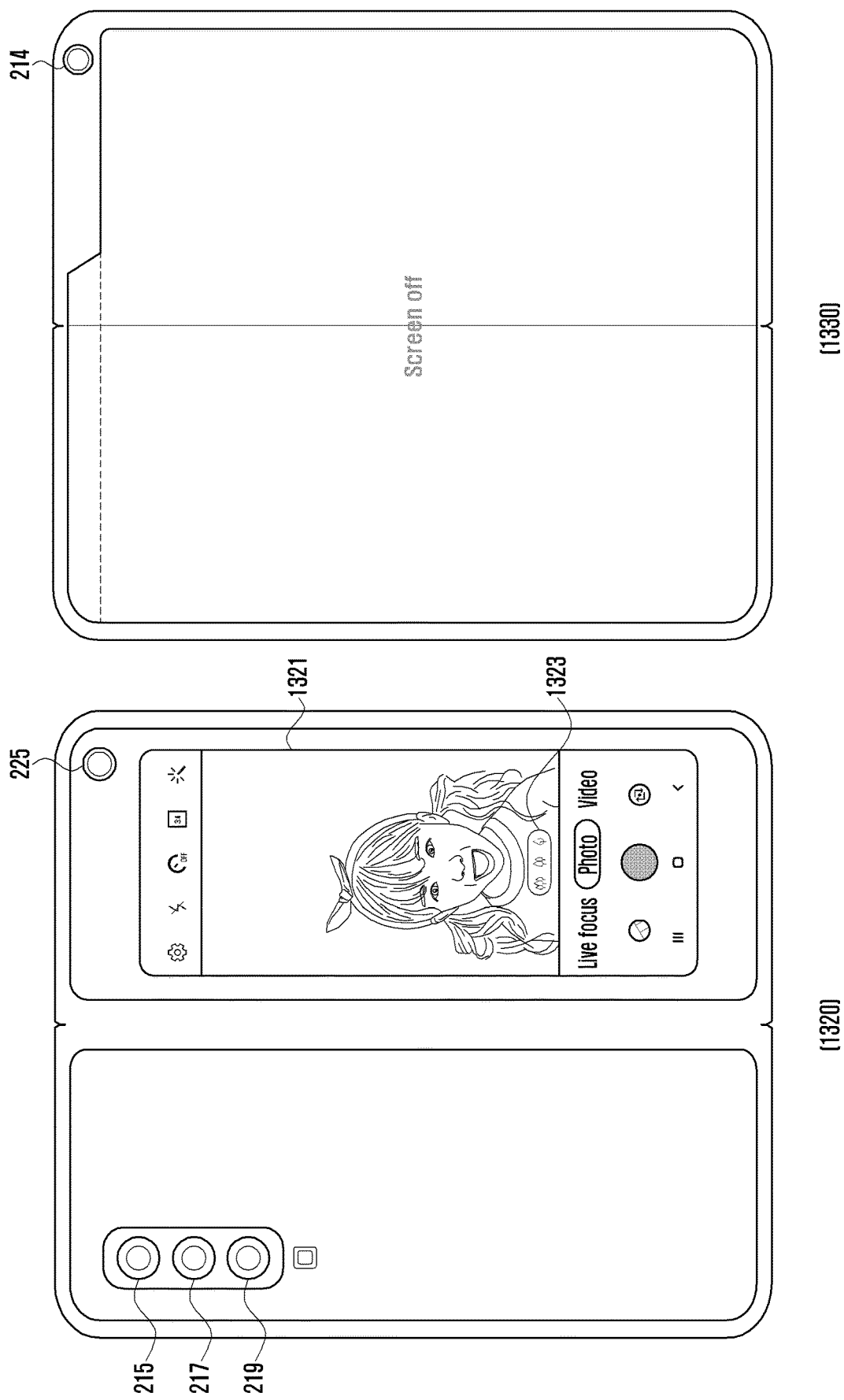

FIGS. 13A-13B are views illustrating an example of controlling a display according to a camera performing image capturing in an electronic device according to an embodiment.

FIG. 13A illustrates an example of capturing an image in the Selfie mode by an electronic device in the closed state.

Referring to FIG. 13A, a processor (e.g. processor 120 in FIG. 1) of an electronic device (e.g. electronic device 101 in FIG. 1) according to an embodiment may display an first execution screen 1310 of a camera application on a second display (e.g. second display 240 in FIGS. 2A and 2B) in the closed state (e.g. FIG. 2B). The first execution screen 1310 may include a first preview image 1311 obtained from the fifth camera 225 among a plurality of cameras (e.g. second camera 215 to fifth camera 225 in FIGS. 2A and 2B) included (or mounted) in the electronic device 101. The first execution screen 1310 may also include image capturing mode information 1313. The processor 120 may or may not display a plurality of camera objects for when capturing images in the Selfie mode in the closed state.

FIG. 13B illustrates an example of capturing an image in the Selfie mode by an electronic device in an open state.

Referring to FIG. 13B, the processor 120 may display a second execution screen 1320 of a camera application on the second display 240 in the open state (e.g. FIG. 2A). The second execution screen 1320 may include a second preview image 1321 obtained from the fifth camera 225 among the plurality of cameras (e.g. first camera 214 to fifth camera 225 in FIGS. 2A and 2B) included (or mounted) in the electronic device 101. The second execution screen 1320 may also include a plurality of camera objects 1323. If the electronic device 101 is changed (converted) to the open state during image capturing in the Selfie mode in the closed state, the processor 120 may maintain the OFF state of a first display (e.g. first display 230 in FIGS. 2A and 2B). The first display 230 is turned off when the electronic device 101 is in the closed state, and if the electronic device is changed to the open state while taking a selfie in the closed state, the processor 120 may maintain the OFF state of the first display. A third execution screen 1330 illustrates the first display 230 that has been turned off.

Figure 14:
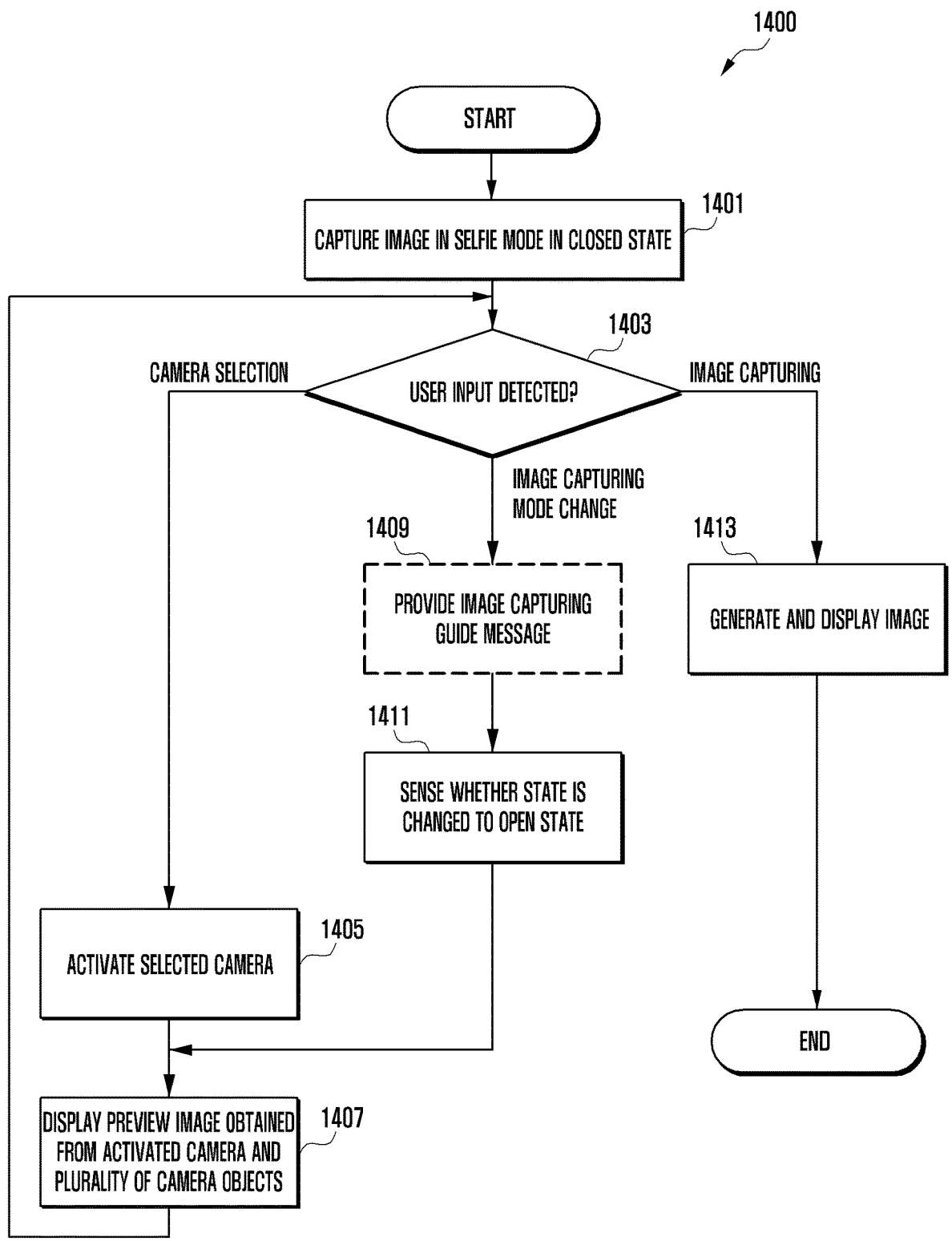
FIG. 14 is a flowchart illustrating a method for controlling image capturing, based on a user input in a closed state of an electronic device according to an embodiment.

FIG. 14 is a flowchart illustrating a method for controlling image capturing, based on a user input in a closed state of an electronic device according to an embodiment.

Referring to FIG. 14, in operation 1401, a processor (e.g. processor 120 in FIG. 2) of an electronic device (e.g. electronic device 101 in FIG. 1) according to an embodiment may capture an image in the Selfie mode in the closed state (e.g. FIG. 2B). The processor 120 may capture the image in the Selfie mode by activating a fifth camera 225 among a plurality of cameras (e.g. second camera 215 to fifth camera 225 in FIGS. 2A and 2B) included (or mounted) in the electronic device 101, when the electronic device 101 is in the closed state. Operation 1401 is identical or similar to operation 1201 in FIG. 12, and thus the detailed description of operation 1401 will be omitted.

In operation 1403, the processor 120 may identify (or sense) whether a user input is detected. The processor 120 may detect a touch input on an execution screen (e.g.

execution screen 1310 in FIG. 13A) displayed on the second display (e.g. second display 240 in FIGS. 2A and 2B) or an input detected by a physical button. For example, the processor 120 may detect a user input of selecting one of configuration information (e.g. configuration information 411 in FIG. 4), image capturing mode information (e.g. image capturing mode information 415 in FIG. 4), image capturing control information (e.g. image capturing control information 417), or a plurality of camera objects (e.g. plurality of camera objects 1123 in FIG. 11B) on the execution screen 1310. The processor 120 may perform operation 1405 if the user input corresponds to a camera selection, may perform operation 1411 if the user input corresponds to an image capturing mode change, and may perform operation 1413 if the user input corresponds to an image capturing button.

If the user input corresponds to a camera selection, the processor 120 may activate a selected camera in operation 1405. The camera selection may correspond to a user input of selecting an object corresponding to a camera among the plurality of camera objects displayed in operation 1401. According to an embodiment, the processor 120 may activate the selected camera among the plurality of cameras disposed on the rear surface 250 of the electronic device 101. The plurality of cameras disposed on the rear surface 250 of the electronic device 101 may include at least one of the second camera 215, the third camera 217, the fourth camera 219, or the fifth camera 225. For example, if the fifth camera 225 is activated in operation 1401, the processor 120 may activate one selected from the second camera 215, the third camera 217, or the fourth camera 219. To help understanding of the disclosure, the following description is based on an example where the second camera 215 is selected in operation 1403. However, the disclosure is not so limited.

In operation 1407, the processor 120 may display a second preview image obtained from the activated camera and a plurality of camera objects. For example, the processor 120 may display an execution screen including a preview image obtained from the second camera 215 and a plurality of camera objects on the second display 240. The execution screen in operation 1401 may be different from the execution screen in operation 1407. In operation 1401, a preview image obtained from the fifth camera 225 may be displayed, and in operation 1407, a preview image obtained from the second camera 215 may be displayed. The preview image obtained from the fifth camera 225 when the electronic device 101 is in the closed state may be a selfie image (e.g. execution screen 1310 in FIG. 13A), and the preview image obtained from the second camera 215 when the electronic device 101 is in the closed state may be a background image (e.g. execution screen 1110 in FIG. 11A).

If the user input corresponds to an image capturing mode change, the processor 120 may provide an image capturing guide message in operation 1409. The image capturing mode change may correspond to a change from "Selfie" to "Rear Selfie". The processor 120 may provide an image capturing guide message (e.g. image capturing guide message 631 in FIG. 6C) to guide the user to change the state of the electronic device 1010 from the closed state to the open state in order to capture an image in the Rear Selfie mode. Operation 1409 can be omitted according to implementation of the electronic device 101.

In operation 1411, the processor 120 may sense whether the electronic device 101 is changed to the open state (e.g. FIG. 2A). The processor 120 may sense (or detect) whether the electronic device 101 is changed to the open state by the user. The open state (e.g. state of electronic device 101 in FIG. 2A) may mean that the angle between the first housing 210 and the second housing 220 is 180 degrees, and in the open state, the first surface 211 of the first housing 210 and the second surface 221 of the second housing 220 may be arranged to be oriented in the identical direction. The processor 120 may also sense an intermediate state, and the intermediate state may suffice as the open state. If the electronic device is changed to the open state, the processor 120 may perform operation 1407. For example, if electronic device is changed to the open state, the processor 120 may activate a camera according to the image capturing mode change, and perform operation 1407.

If the user input corresponds to an image capturing button, the processor 120 may generate and display an image in operation 1413. If an image capturing button is selected by the user, the processor 120 may generate an image (e.g. photograph) based on the preview image obtained from the fifth camera 225. The processor 120 may display the generated image on the second display 240. Operation 1413 is identical or similar to operation 711 in FIG. 7 or operation 1017 in FIG. 10, and thus the detailed description of operation 1413 will be omitted.

Figure 15:
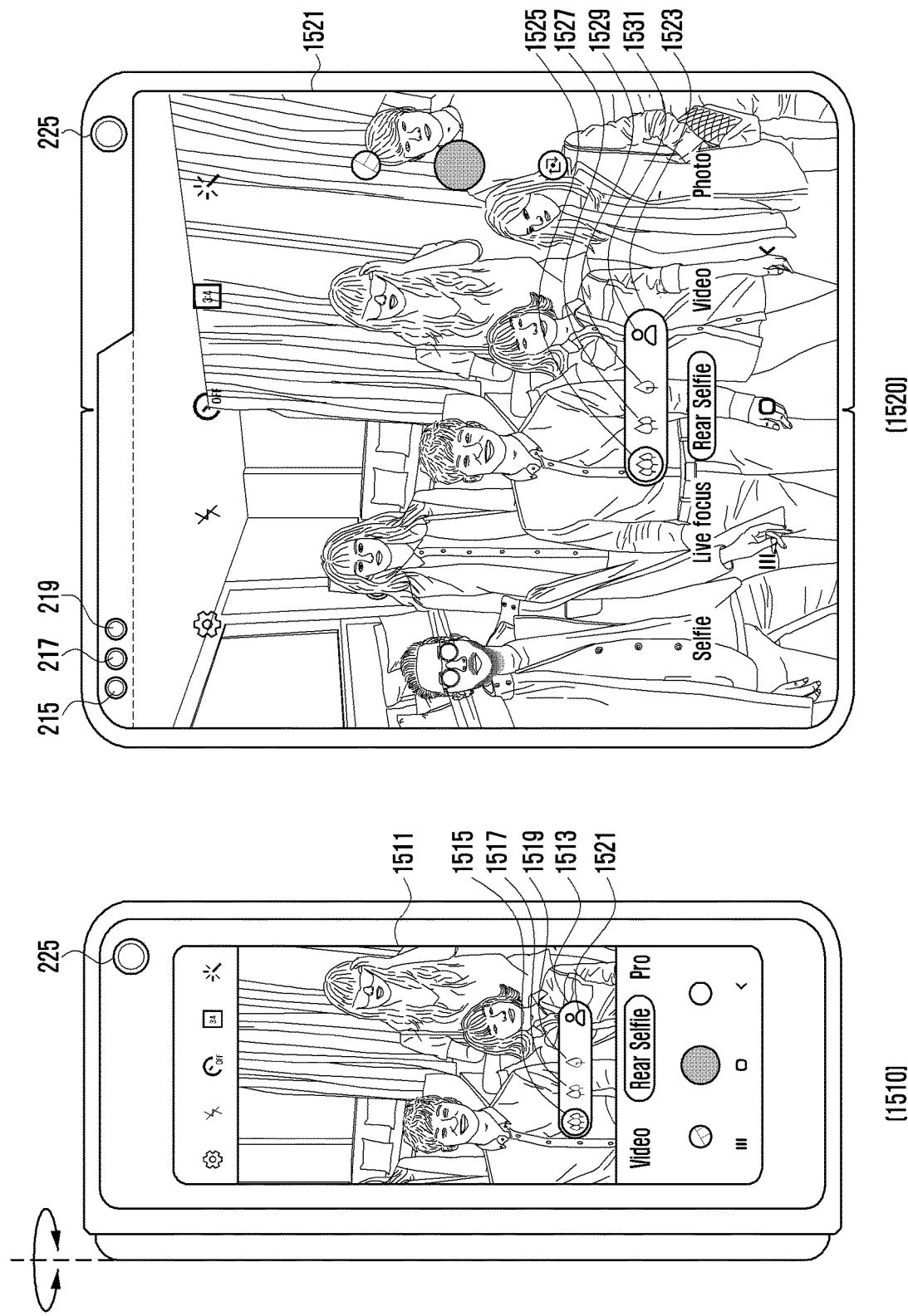
FIG. 15 is a view illustrating an example of image capturing by an out-folding type electronic device according to an embodiment.

FIG. 15 is a view illustrating an example of image capturing by an out-folding type electronic device according to an embodiment.

Referring to FIG. 15, an electronic device (e.g. electronic device 101 in FIG. 1) according to an embodiment may be implemented as an out-folding type. In the in-folding type electronic device, the first surface (e.g. first surface 211 in FIGS. 2A and 2B) of the first housing (e.g. first housing 210 in FIGS. 2A and 2B) and the second surface (e.g. second surface 221 in FIGS. 2A and 2B) of the second housing (e.g. second housing 220 in FIGS. 2A and 2B) may face each other when folded. In the out-folding type electronic device, the third surface (e.g. third surface 213 in FIGS. 2A and 2B) of the first housing 210 and the fourth surface (e.g. fourth surface 223 in FIGS. 2A and 2B) of the second housing 220 may face each other when folded. Both in-folding type and out-folding type electronic devices may include the first display 230 in FIG. 2A. However, when folded, the first display 230 may be exposed on the exterior of the device. As such, the out-folding type electronic device may not include the second display 240 in FIGS. 2A and 2B, and only include the first display 230.

The out-folding type electronic device may include a first camera (e.g. first camera 214 in FIG. 2A) disposed on a rear surface (e.g. third surface 213 of first housing 210) of the electronic device 101. The out-folding type electronic device may include a plurality of cameras disposed on a front surface (e.g. first surface 211 of first housing 210 and second surface 221 of second housing 220) of the electronic device. For example, a second camera 215, a third camera 217, and a fourth camera 219 may be disposed on the first surface 211 of the first housing 210, and a fifth camera 225 may be disposed on the second surface 221 of the second housing 220.

A processor (e.g. processor 120 in FIG. 1) of the out-folding type electronic device may display, in the closed state (e.g. FIG. 2B), a first execution screen 1510 that includes a preview image 1511 obtained from one (e.g. fifth camera 225) among a plurality of cameras (e.g. second camera 215 to fifth camera 225) included (or mounted) in the electronic device. The first execution screen 1510 may also include a plurality of camera objects 1513. The plurality of camera objects 1513 may include individual objects corresponding to the second camera 215, the third camera 217, the fourth camera 219, and the fifth camera 225.

A processor 120 of the out-folding type electronic device may display, in the open state (e.g. FIG. 2A), a second execution screen 1520 that includes a preview image 1521 obtained from one (e.g. second camera 215) among a plurality of cameras (e.g. first camera 214 to fifth camera 225 in FIG. 15) included (or mounted) in the electronic device. The second execution screen 1520 may also include a plurality of camera objects 1523. The plurality of camera objects 1523 may include a first object 1525 corresponding to the second camera 215, a second object 1527 corresponding to the third camera 217, a third object 1529 corresponding to the fourth camera 219, or a fourth object 1531 corresponding to the fifth camera 225. The processor 120 may select the second camera 215 to the fifth camera 225, based on a user input of selecting one among the plurality of camera objects in an open state.

Although not illustrated, the processor 120 may display an object corresponding to a first camera 214 disposed on the rear surface of the electronic device in the plurality of camera objects 1523.

An operation method of a foldable electronic device (e.g. electronic device 101 in FIG. 1) including a first display (e.g. first display 230 in FIGS. 2A and 2B) disposed on a first surface and a second surface of the foldable electronic device and a second display (e.g. second display 240 in FIGS. 2A and 2B) disposed in a direction opposite to the first display according to an embodiment may include: when the foldable electronic device is in a closed state, displaying, on the second display, a preview image obtained from at least one first camera module (e.g. fifth camera 225 in FIGS. 2A and 2B) disposed on a third surface (e.g. third surface 213 in FIGS. 2A and 2B) on which the second display is disposed; detecting a user input for changing an image capturing mode; sensing whether a state of the foldable electronic device is changed, in response to detecting the user input for changing the image capturing mode; and when the state of the foldable electronic device is changed, displaying, on the second display, information relating to a plurality of second camera modules (e.g. second camera 215, third camera 217, and fourth camera 219 in FIGS. 2A and 2B) disposed on a fourth surface (e.g. fourth surface 223 in FIGS. 2A and 2B) extending from the third surface in an open state of the foldable electronic device.

The method may further include: when the foldable electronic device is changed from the closed state to the open state, displaying a plurality of camera objects corresponding to the plurality of second camera modules on the second display.

The method may further include: when the state of the foldable electronic device is changed, activating at least one camera module among the plurality of second camera modules; and displaying a preview image obtained from the activated camera module, and a plurality of camera objects corresponding to the plurality of second camera modules on the second display.

The method may further include: when the state of the foldable electronic device is changed, turning off the at least one first camera module; and activating at least one camera module among the plurality of second camera modules.

The method may further include: when the state of the foldable electronic device is changed, activating at least one third camera module among the plurality of second camera modules; displaying a first preview image obtained from the activated third camera module, and a first plurality of camera objects corresponding to the plurality of second camera modules on the second display; detecting a user input of selecting an object corresponding to a fourth camera module among the plurality of camera objects; and displaying a second preview image obtained from the fourth camera module, and a second plurality of camera objects corresponding to the plurality of second camera modules on the second display.

According to an embodiment, a user can take a selfie with a camera having good performance while viewing himself or herself through a display.

According to an embodiment, when a foldable device is unfolded, a preview image (e.g. the user's face in Selfie mode) may be obtained from at least one camera among a plurality of cameras disposed on a rear surface of the foldable device, and a user interface allowing a selection of at least one camera among a plurality of cameras can be provided through a display disposed on the rear surface.

The embodiments of the disclosure described and shown in the specification and the drawings have presented specific examples in order to easily explain the technical contents of the disclosure and help understanding of the disclosure, and are not intended to limit the scope of the disclosure. Therefore, the scope of the disclosure should be construed to include, in addition to the embodiments disclosed herein, all changes and modifications that are derived on the basis of the technical idea of the disclosure.

Certain of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

What is claimed is:

1. A foldable electronic device comprising:
   a first housing including a first surface and a third surface opposite to the first surface;
   a second housing including a second surface extending from the first surface and a fourth surface opposite to the second surface;
   a first display disposed on the first surface and the second surface;
   a second display disposed on at least a part of the third surface;
   at least one first camera module disposed on at least a part of the third surface;
   a plurality of second camera modules disposed on at least a part of the fourth surface;
   a memory; and
   a processor,
   wherein the processor is configured to:
      when the foldable electronic device is in a closed state, display a preview image obtained from the at least one first camera module on the second display;
      detect a user input for changing an image capturing mode;

sense whether a state of the foldable electronic device is changed, in response to detecting the user input for changing the image capturing mode; and when the state of the foldable electronic device is changed, display information relating to the plurality of second camera modules on the second display.

2. The foldable electronic device of claim 1, wherein the processor is configured to, when the foldable electronic device is changed from the closed state to an open state, display a plurality of camera objects corresponding to the plurality of second camera modules on the second display.

3. The foldable electronic device of claim 2, wherein each of the plurality of second camera modules has different camera characteristics, and
wherein the processor is configured to display objects included in the plurality of camera objects to have different shapes or sizes corresponding to the different camera characteristics.

4. The foldable electronic device of claim 2, wherein the processor is configured to select at least one camera module among the plurality of second camera modules, based on a user input of selecting at least one object included in the plurality of camera objects.

5. The foldable electronic device of claim 1, wherein the processor is configured to:
when the state of the foldable electronic device is changed, activate at least one camera module among the plurality of second camera modules; and
display a preview image obtained from the activated camera module, and a plurality of camera objects corresponding to the plurality of second camera modules on the second display.

6. The foldable electronic device of claim 1, wherein the processor is configured to, when the state of the foldable electronic device is changed, turn off the at least one first camera module and activate at least one camera module among the plurality of second camera modules.

7. The foldable electronic device of claim 1, wherein the processor is configured to, when the user input for changing the image capturing mode is detected, provide an image capturing guide message.

8. The foldable electronic device of claim 1, wherein the processor is configured to, when the state of the foldable electronic device is changed, display a plurality of camera objects corresponding to the at least one first camera module and the plurality of second camera modules on the second display.

9. The foldable electronic device of claim 1, wherein the processor is configured to:
when the state of the foldable electronic device is changed, activate at least one camera module among the plurality of second camera modules; and
display a preview image obtained from the activated camera module, and a plurality of camera objects corresponding to the at least one first camera module and the plurality of second camera modules on the second display.

10. The foldable electronic device of claim 1, wherein the processor is configured to, when the state of the foldable electronic device is changed, maintain an OFF state of the first display.

11. The foldable electronic device of claim 1, wherein the processor is configured to:
when the state of the foldable electronic device is changed, activate at least one third camera module among the plurality of second camera modules;
display a first preview image obtained from the activated third camera module, and a first plurality of camera objects corresponding to the plurality of second camera modules on the second display; and
when a first object corresponding to a fourth camera module among the plurality of camera objects is selected, display a second preview image obtained from the fourth camera module, and a second plurality of camera objects corresponding to the plurality of second camera modules on the second display.

12. The foldable electronic device of claim 11, wherein the first preview image and the second preview image are different, and
wherein the first plurality of camera objects and the second plurality of camera objects are different.

13. The foldable electronic device of claim 11, wherein the first plurality of camera objects are configured to indicate that a second object corresponding to the third camera module is selected, and
wherein the second plurality of camera objects are configured to indicate that the first object corresponding to the fourth camera module is selected.

14. A foldable electronic device comprising:
a first surface oriented in a first direction in a folded state and a second surface oriented in a second direction opposite to the first direction;
a first display disposed on the first surface;
at least one first camera module disposed on the first surface;
a plurality of second camera modules disposed on the second surface;
a memory; and
a processor,
wherein the processor is configured to:
when the foldable electronic device is in the folded state, display a preview image obtained from the at least one first camera module on the first display;
detect a user input for changing an image capturing mode;
sense whether the foldable electronic device is unfolded, in response to detecting the user input for changing the image capturing mode; and
when the foldable electronic device is unfolded, display information relating to the plurality of second camera modules on the first display.

15. The foldable electronic device of claim 14, further comprising:
a third surface and a fourth surface; and
a second display disposed on the third surface and the fourth surface, wherein the third surface faces the fourth surface in the folded state.

16. An operation method of a foldable electronic device comprising a first display disposed on a first surface and a second surface of the foldable electronic device and a second display disposed in a direction opposite to the first display, the operation method comprising:
when the foldable electronic device is in a closed state, displaying, on the second display, a preview image obtained from at least one first camera module disposed on a third surface on which the second display is disposed;
detecting a user input for changing an image capturing mode;
sensing whether a state of the foldable electronic device is changed, in response to detecting the user input for changing the image capturing mode; and when the state of the foldable electronic device is changed, displaying, on the second display, information relating to a plurality of second camera modules disposed on a fourth surface extending from the third surface in an open state of the foldable electronic device.

17. The operation method of claim 16, further comprising, when the foldable electronic device is changed from the closed state to the open state, displaying a plurality of camera objects corresponding to the plurality of second camera modules on the second display.

18. The operation method of claim 16, further comprising:
when the state of the foldable electronic device is changed, activating at least one camera module among the plurality of second camera modules; and
displaying a preview image obtained from the activated camera module, and a plurality of camera objects corresponding to the plurality of second camera modules on the second display.

19. The operation method of claim 16, further comprising:
when the state of the foldable electronic device is changed, turning off the at least one first camera module; and
activating at least one camera module among the plurality of second camera modules.

20. The operation method of claim 16, further comprising:
when the state of the foldable electronic device is changed, activating at least one third camera module among the plurality of second camera modules;
displaying a first preview image obtained from the activated third camera module, and a first plurality of camera objects corresponding to the plurality of second camera modules on the second display;
detecting a user input of selecting an object corresponding to a fourth camera module among the plurality of camera objects; and
displaying a second preview image obtained from the fourth camera module, and a second plurality of camera objects corresponding to the plurality of second camera modules on the second display.

* * * * *